US012379978B1

(12) United States Patent
Sanders

(10) Patent No.: US 12,379,978 B1
(45) Date of Patent: Aug. 5, 2025

(54) AUTOMATICALLY SCALING A CLUSTER OF NODES BASED ON DEPLOYMENTS OF CONTAINERIZED APPLICATIONS

(71) Applicant: SAS Institute Inc., Cary, NC (US)

(72) Inventor: Mark Alexander Sanders, Apex, NC (US)

(73) Assignee: SAS INSTITUTE INC., Cary, NC (US)

( * ) Notice: Subject to any disclaimer, the term of this patent is extended or adjusted under 35 U.S.C. 154(b) by 0 days.

(21) Appl. No.: 18/749,194

(22) Filed: Jun. 20, 2024

Related U.S. Application Data

(60) Provisional application No. 63/559,005, filed on Feb. 28, 2024, provisional application No. 63/548,799, filed on Feb. 1, 2024.

(51) Int. Cl.
 *G06F 3/00* (2006.01)
 *G06F 9/54* (2006.01)

(52) U.S. Cl.
 CPC .................................. *G06F 9/541* (2013.01)

(58) Field of Classification Search
 CPC ....................................................... G06F 9/50
 See application file for complete search history.

(56) References Cited

U.S. PATENT DOCUMENTS 10,459,769 B2 * 10/2019 Venkatesh ............. G06F 9/5083
10,474,497 B1 * 11/2019 Kancharla ............... G06F 9/546
10,503,448 B1 * 12/2019 Chhabra ............. G06F 9/44505
10,574,698 B1 * 2/2020 Sharifi Mehr ...... H04L 63/1491
11,861,221 B1 * 1/2024 Richardson ........... G06F 3/0604

(Continued)

FOREIGN PATENT DOCUMENTS

| CN | 111338752 A | * | 6/2020 | ......... G06F 9/45533 |
| CN | 114064204 A | * | 2/2022 | |
| CN | 116391175 A | * | 7/2023 | ......... G06F 16/2308 |
| WO | WO-2022235624 A1 | * | 11/2022 | |

OTHER PUBLICATIONS

Mingming Wang, A Cluster Autoscaler Based on Multiple Node Types in Kubernetes. (Year: 2020).*

(Continued)

*Primary Examiner* — Lechi Truong
(74) *Attorney, Agent, or Firm* — Kilpatrick Townsend & Stockton LLP

(57) ABSTRACT

In one example, a computer system performs operations including accessing a cluster including a node pool that includes nodes executing deployments. The cluster includes an auto-scaler configured to scale the nodes in the node pool based on a configuration. The configuration includes a minimum setting for the number of nodes for the node pool. The computer system determines that a number of deployments are executing in the node pool that meets or exceeds a threshold. In response, the computer system updates the minimum setting of the auto-scaling configuration for the node pool to a first predefined value sufficient for executing a predefined maximum number of deployments. The computer system later determines that a different number of deployments are executing on the node pool, now below the threshold. In response, the computer system updates the minimum setting of the auto-scaling configuration for the node pool to a second predefined value.

30 Claims, 17 Drawing Sheets

(56) References Cited

U.S. PATENT DOCUMENTS

| | | | |
|---|---|---|---|
| 2013/0125116 A1* | 5/2013 | Liu | G06F 9/5077 718/1 |
| 2015/0378765 A1* | 12/2015 | Singh | G06F 3/04847 718/1 |
| 2016/0253119 A1* | 9/2016 | Reynolds | G06F 3/0689 711/170 |
| 2017/0286146 A1* | 10/2017 | Voigt | G06F 9/485 |
| 2017/0359271 A1* | 12/2017 | Koh | H04L 41/0654 |
| 2018/0076934 A1* | 3/2018 | Huitema | H04L 1/1832 |
| 2018/0276021 A1* | 9/2018 | Ueda | G06F 9/5027 |
| 2018/0365198 A1* | 12/2018 | Kim | G06F 40/197 |
| 2019/0220315 A1* | 7/2019 | Vallala | G06F 11/1482 |
| 2019/0370080 A1* | 12/2019 | Patel | H04L 43/0876 |
| 2020/0326984 A1* | 10/2020 | Wu | G06F 16/17 |
| 2021/0051060 A1* | 2/2021 | Parvataneni | H04L 43/16 |
| 2021/0117220 A1* | 4/2021 | Zu | G06F 9/5077 |
| 2021/0263780 A1* | 8/2021 | Ou | G06F 9/5077 |
| 2022/0413937 A1* | 12/2022 | Xie | G06F 9/45558 |
| 2023/0028922 A1* | 1/2023 | Wang | H04L 45/58 |
| 2023/0047781 A1* | 2/2023 | Narayanan | G06F 16/285 |
| 2023/0125847 A1* | 4/2023 | Sato | G06F 9/50 718/1 |
| 2023/0153172 A1* | 5/2023 | Li | G06F 9/5033 719/328 |
| 2023/0195622 A1* | 6/2023 | Vavilapalli | G06F 12/0802 711/118 |
| 2023/0222006 A1* | 7/2023 | Zhu | G06F 9/5077 718/104 |
| 2023/0284254 A1* | 9/2023 | Rai | G06N 3/092 455/454 |
| 2023/0318988 A1* | 10/2023 | Wang | H04L 47/781 709/226 |
| 2023/0421454 A1* | 12/2023 | Okuno | G06F 9/544 |
| 2024/0311951 A1* | 9/2024 | Panneer | G06T 15/005 |
| 2024/0411609 A1* | 12/2024 | Saur | G06F 9/5077 |

OTHER PUBLICATIONS

Konstantinos Karanasos, Mercury: Hybrid Centralized and Distributed Scheduling in Large Shared Clusters. (Year: 2015).*

Jeremy Casas, MIST: PVM with Transparent Migration and Checkpointing. (Year: 1995).*

Kubecost.com "Kubernetes Cluster Autoscaler" Chapter 3, Jun. 12, 2024 Stackwatch, Inc. https://www.kubecost.com/kubernetes-autoscaling/kubernetes-cluster-autoscaler/.

"About Cluster Autoscaling" Google Kubernetes Engine (GKE) Jun. 11, 2024; 10 pages. https://cloud.google.com/kubernetes-engine/docs/concepts/cluster-autoscaler.

"Autoscaling" Wikipedia, Jun. 12, 2024, 7 Pages. https://en.wikipedia.org/wiki/Autoscaling.

Use the Cluster Autoscaler in Azure Kubernetes Service (AKS); Jan. 12, 2024, 13 pages. https://learn.microsoft.com/en-us/azure/aks/cluster-autoscaler?tabs=azure-cli.

Shtein, Nir "Cluster Autoscaler: How it Works and Solving Common Problems" Komodor, Jun. 11, 2024, 15 pages https://komodor.com/learn/cluster-autoscaler/.

Spazzoli, Raffaele "How Full is My Cluster, Part 6: Proactive Node Autoscaling" Feb. 23, 2021, RedHat Blog https://www.redhat.com/en/blog/how-full-is-my-cluster-part-6-proactive-node-autoscaling.

Oracle Cloud Infrastructure Documentation "Autoscaling Kubernetes Node Pools and Pods" Nov. 3, 2023, 2 pages. https://docs.oracle.com/en-us/iaas/Content/ContEng/Tasks/contengautoscalingclusters.htm.

Red Hat Open Shift "Applying autoscaling to an OpenShift Container Platform cluster" Jun. 12, 2024, 11 pages. https://docs.openshift.com/container-platform/4.7/machine_management/applying-autoscaling.html.

MongoDB "Configure Auto-Scaling" Jun. 12, 2024, 15 pages. https://www.mongodb.com/docs/atlas/cluster-autoscaling/.

Rancher "Cluster Autoscaler" Jun. 12, 2024, 2 pages. https://ranchermanager.docs.rancher.com/v2.6/how-to-guides/advanced-user-guides/manage-clusters/install-cluster-autoscaler.

Fe, et. al. "Performance-Cost Trade-Off in Auto-Scaling Mechanisms for Cloud Computing" Feb. 5, 2022, 31 pages. https://www.ncbi.nim.nih.gov/pmc/articles/PMC8838331/.

Azure Kubernetes Service "Azure AKS—Cluster Autoscaler" Jun. 12, 2024; 5 pages. https://stacksimplify.com/azure-aks/azure-kubernetes-service-cluster-autoscaler/.

AWS Developer Guide: "Amazon Elastic Container Service" Jun. 12, 2024; 1,571 pages.

* cited by examiner

```
def main(namespace_BTL01: func.TimerRequest) -> None:
    """Main entry point of function"""
    btl = fh.BTLFunctionHelper()  ──1602
    set_high = False
    resource_group = 'ardaksbt101-rg'
    cluster = 'ardaksbt101-aks'
    namespace_count_at_rest = 10
    namespace_current_count = 0
    node_count_dict = {'minCount' : '1', 'casHighCount' : '5',                    ──1604
                       'casMaxCount' : '6', 'genHighCount' : '10', 'genMaxCount' : '12'}
    login_cmd = ('login', '--service-principal', '-u', config.username,
                 '-p', config.password, '--tenant', config.tenant)

utc_timestamp = datetime.datetime.utcnow().replace(
        tzinfo=datetime.timezone.utc).isoformat()

if namespace_BTL01.past_due:
        logging.warning(f'{cluster} timer is past due!')

logging.info(f'{cluster} timer trigger function ran at {utc_timestamp}')

az_cli = get_default_cli()  ──1606
    az_cli.invoke(login_cmd)
    namespace_current_count = btl.get_namespace_count(az_cli, resource_group, cluster)

set_high = btl.do_set_high(cluster, namespace_count_at_rest, namespace_current_count)

btl.set_pool_sizes(set_high, az_cli, resource_group, cluster, node_count_dict, 'cas')

btl.set_pool_sizes(set_high, az_cli, resource_group, cluster, node_count_dict, 'generic')
```

AUTOMATICALLY SCALING A CLUSTER OF NODES BASED ON DEPLOYMENTS OF CONTAINERIZED APPLICATIONS

REFERENCE TO RELATED APPLICATIONS

The claims the benefit of priority under 35 U.S.C. § 119(e) to U.S. Provisional Patent Application No. 63/548,799, filed Feb. 1, 2024 and U.S. Provisional Patent Application No. 63/559,005, filed Feb. 28, 2024, the entirety of each of which is hereby incorporated by reference herein.

TECHNICAL FIELD

The present disclosure relates generally to node scaling in a computing cluster. More specifically, but not by way of limitation, this disclosure relates to automatically scaling the number of nodes in a computing cluster based on deployments of containerized applications.

BACKGROUND

Containerization of applications coupled with ubiquitous virtualization technologies and cloud computing environments has enabled rapidly scalable and fault-tolerant computing. A typical application deployment may involve deploying a number of containers to a cluster configured for containerized applications. Each container may be executing a self-contained module of an application. The cluster may be made up of a number of node pools, each of which includes a number of nodes. Nodes may be servers or virtual machines that can execute one or more containers.

In practice, the number of nodes required during testing and production operations can be difficult to predict. As a result, various facilities and options exist for scaling clusters up or down. Scaling may involve, for example, adding nodes to or removing nodes from a node pool. Some clusters may include features for auto-scaling in which the cluster automatically resizes node pools, starts or stops nodes, or adjusts the number of deployed containers in response to certain criteria, such as the application load exceeding a predetermined value.

SUMMARY

One example of the present disclosure includes a system including one or more processors and one or more memories including instructions that are executable by the one or more processors for causing the one or more processors to perform operations. The operations can include accessing a computing cluster including a node pool that includes one or more nodes executing one or more deployments, in which the computing cluster includes an auto-scaler configured to auto-scale a number of nodes in the node pool based on an auto-scaling configuration for the node pool, the auto-scaling configuration including a minimum setting that controls a minimum number of nodes for the node pool and a maximum setting that controls a maximum number of nodes for the node pool. The operations can further include determining, at a first time, that a first number of deployments are executing in the node pool. The operations can further include determining that the first number of deployments meets or exceeds a threshold number of deployments. The operations can further include, in response to determining that the first number of deployments meets or exceeds the threshold number of deployments, updating the minimum setting of the auto-scaling configuration for the node pool to a first predefined value, the first predefined value being a first number of nodes sufficient for executing a predefined maximum number of deployments, in which the predefined maximum number of deployments is greater than or equal to the first number of deployments. The operations can further include determining, at a second time, that a second number of deployments are executing on the node pool. The operations can further include determining that the second number of deployments is below the threshold number of deployments. The operations can further include, in response to determining that the second number of deployments is below the threshold number of deployments, updating the minimum setting of the auto-scaling configuration for the node pool to a second predefined value, the second predefined value being a second number of nodes sufficient for executing at least the threshold number of deployments, the second number of nodes being less than the first number of nodes.

Another example of the present disclosure includes a method of operations, which can be executed by one or more processors. The operations can include accessing a computing cluster including a node pool that includes one or more nodes executing one or more deployments, in which the computing cluster includes an auto-scaler configured to auto-scale a number of nodes in the node pool based on an auto-scaling configuration for the node pool, the auto-scaling configuration including a minimum setting that controls a minimum number of nodes for the node pool and a maximum setting that controls a maximum number of nodes for the node pool. The operations can further include determining, at a first time, that a first number of deployments are executing in the node pool. The operations can further include determining that the first number of deployments meets or exceeds a threshold number of deployments. The operations can further include, in response to determining that the first number of deployments meets or exceeds the threshold number of deployments, updating the minimum setting of the auto-scaling configuration for the node pool to a first predefined value, the first predefined value being a first number of nodes sufficient for executing a predefined maximum number of deployments, in which the predefined maximum number of deployments is greater than or equal to the first number of deployments. The operations can further include determining, at a second time, that a second number of deployments are executing on the node pool. The operations can further include determining that the second number of deployments is below the threshold number of deployments. The operations can further include, in response to determining that the second number of deployments is below the threshold number of deployments, updating the minimum setting of the auto-scaling configuration for the node pool to a second predefined value, the second predefined value being a second number of nodes sufficient for executing at least the threshold number of deployments, the second number of nodes being less than the first number of nodes.

Another example of the present disclosure includes a non-transitory computer-readable medium including program code that is executable by one or more processors for causing the one or more processors to perform operations. The operations can include accessing a computing cluster including a node pool that includes one or more nodes executing one or more deployments, in which the computing cluster includes an auto-scaler configured to auto-scale a number of nodes in the node pool based on an auto-scaling configuration for the node pool, the auto-scaling configuration including a minimum setting that controls a minimum number of nodes for the node pool and a maximum setting that controls a maximum number of nodes for the node pool. The operations can further include determining, at a first time, that a first number of deployments are executing in the node pool. The operations can further include determining that the first number of deployments meets or exceeds a threshold number of deployments. The operations can further include, in response to determining that the first number of deployments meets or exceeds the threshold number of deployments, updating the minimum setting of the auto-scaling configuration for the node pool to a first predefined value, the first predefined value being a first number of nodes sufficient for executing a predefined maximum number of deployments, in which the predefined maximum number of deployments is greater than or equal to the first number of deployments. The operations can further include determining, at a second time, that a second number of deployments are executing on the node pool. The operations can further include determining that the second number of deployments is below the threshold number of deployments. The operations can further include, in response to determining that the second number of deployments is below the threshold number of deployments, updating the minimum setting of the auto-scaling configuration for the node pool to a second predefined value, the second predefined value being a second number of nodes sufficient for executing at least the threshold number of deployments, the second number of nodes being less than the first number of nodes.

This summary is not intended to identify key or essential features of the claimed subject matter, nor is it intended to be used in isolation to determine the scope of the claimed subject matter. The subject matter should be understood by reference to appropriate portions of the entire specification, any or all drawings, and each claim.

The foregoing, together with other features and examples, will become more apparent upon referring to the following specification, claims, and accompanying drawings.

BRIEF DESCRIPTION OF THE DRAWINGS

The present disclosure is described in conjunction with the appended figures:

FIG. 16 depicts example program code for automatically scaling a cluster of nodes based on deployments of containerized applications, according to some aspects of the present disclosure.

Figure 1:
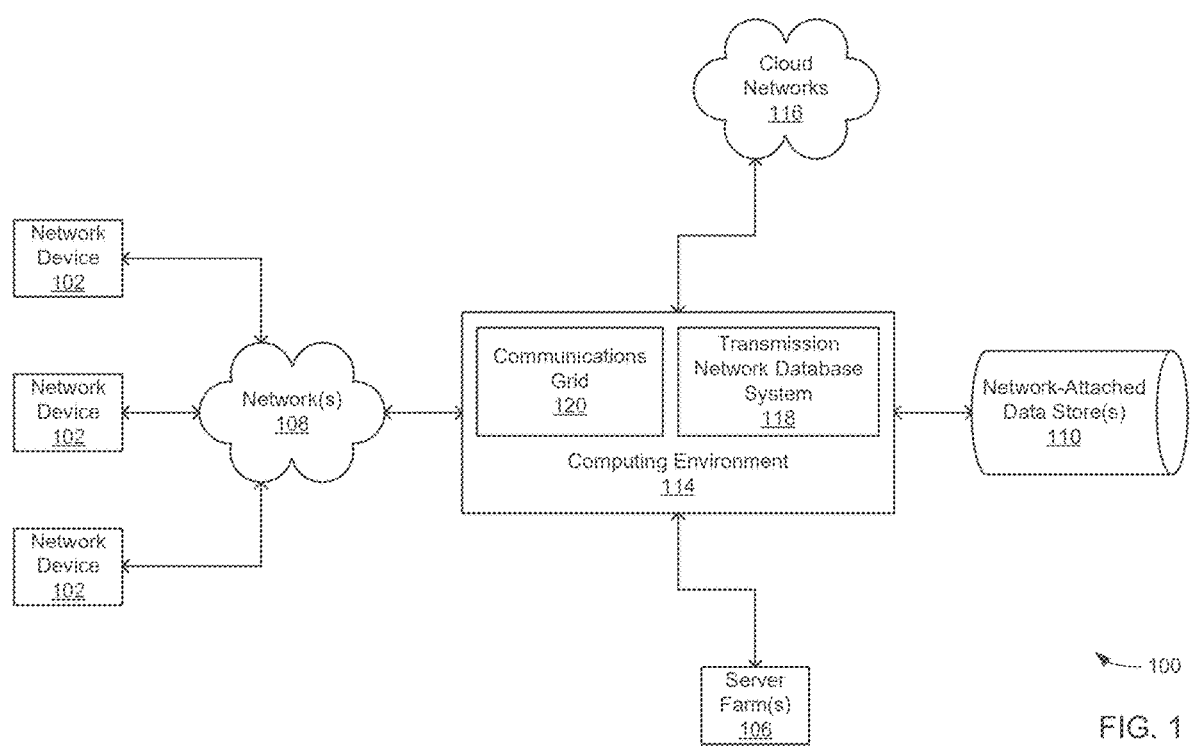
FIG. 1 shows an example of the hardware components of a data transmission network according to some aspects of the present disclosure.

In the appended figures, similar components or features can have the same reference number. Further, various components of the same type may be distinguished by following the reference number with a lowercase letter that distinguishes among the similar components. If only the first reference number is used in the specification, the description is applicable to any one of the similar components having the same first reference number irrespective of the lowercase letter.

DETAILED DESCRIPTION

Large, monolithic deployments to application servers have largely given way to distributed, containerized deployments. In a containerized deployment, the application is divided into an arbitrary number of networked, self-contained modules of executable software. For instance, an application may include a database container, a web server container, and a cache container. A principal advantage of this architecture is scalability. For instance, if the application is slowing down due to a high load on the database container, then additional, near-identical containers can be simply started to share load with the executing container thereby supply additional capacity.

Complex applications may include numerous containers. Each container added to an application can geometrically increase the complexity of the networking configuration, storage requirements, monitoring burden, and so on. For this reason, container orchestration software such as the Cloud Native Computing Foundation's Kubernetes or Red Hat's OpenShift is typically used to automate functions such as container deployment, management, scaling, networking, storage configuration, etc.

Container orchestration software can be deployed on a computing cluster to facilitate the deployment and management of containerized application deployments on the computing cluster. A computing cluster may include a set of physical or virtual machines running containerized applications managed by the container orchestration software. In this disclosure, the physical or virtual machines in the computing cluster are referred to as nodes. Each node can execute one or more containers. The container orchestration software can be used to deploy one or more containers to each node. Nodes can be grouped into node pools, which may have a shared configuration or other unifying feature. Thus, a computing cluster may include one or more node pools, each of which includes one or more nodes, each of which may execute one or more containers.

Container orchestration software can be operated in a cloud environment, which can provide ready access to virtualized nodes, unburdening application developers from maintaining physical hardware. Although some examples of this disclosure relate to container orchestration in the context of a cloud computing environment, the techniques disclosed herein apply equally to locally maintained servers, virtual machines, personal computing devices, and so on.

During application execution, the configuration of a computing cluster may be varied to meet the dynamic needs of the application. For example, high load during production operations may require additional web server instances to be started to meet the increasing demand. In that case, the container orchestration software can be used to start up additional web-server containers, start new processes, add additional nodes to node pools, regroup node pools or namespaces, start up an additional cluster instance, or other operations to meet the changing needs. Likewise, during testing operations, execution of a collection of containers to perform a test or group of tests can cause a significant increase in demand on cluster resources requiring additional nodes or container instances. Once the tests are completed, the demand may fall off sharply, and the additional resources can be released. In general, computing cluster configuration changes involving starting or stopping of nodes, or otherwise changing the capacity of the computing cluster in response to changing loads, can be referred to as scaling.

Scaling can be performed manually using an interface provided by the container orchestration software. However, manual cluster scaling can quickly become unmanageable in all but the simplest cases. As a result, some examples of container orchestration software may include utilities for auto-scaling. Auto-scaling can refer generally to a collection of predetermined conditions under which changes to the cluster configuration are effected in response to changing resource utilizations. For instance, auto-scaling can be used to automatically resize node pools, start or stop nodes, or start or stop containers, or change the number of executing containers, among many other possible operations, in response to certain criteria such as application load exceeding a predetermined value.

In a typical example, auto-scaling can be configured to make gradual, incremental, or proportional changes in response to measured parameters relating to cluster load. For instance, auto-scaling can be configured to increase the number of nodes in the node pool in proportion to a measure of load on the node pool, such as CPU utilization, memory usage, or network traffic, as may be experienced upon initiation of a deployment for application testing. Conversely, auto-scaling can be configured to decrease the number of nodes in a node pool when the load drops below certain thresholds. However, these approaches to auto-scaling have proved to be inefficient and the cause of undesired and unpredictable activity in deployed applications. For example, following an increase in cluster load, an auto-scaling utility may start a number of nodes and/or containers. After a period of time, the cluster may become stable. Then again, an increase in cluster load may be detected. The auto-scaling utility may again start a number of nodes and/or containers. These configuration changes may have undesirable follow-on effects, such as the rearrangement of deployed containers among nodes, which may be incompatible with the cluster configuration, causing unpredictable disruptions in container interconnectivity, particularly during testing operations. Some existing approaches involve simply tuning certain auto-scaling configurations to their maximum settings to handle any possible load. For instance, some approaches may involve setting the minimum node pool size to the maximum possible setting. However, such an approach, even if successful in preventing the undesired and unpredictable behavior of the auto-scaler, may be grossly inefficient, wasteful of computing resources, and cost prohibitive.

Some examples of the present disclosure can overcome one or more of the abovementioned challenges by automatically scaling a node pool based on a number of deployments of a containerized application in the node pool. For example, a system can detect the number of deployments of a containerized application in the node pool at a given point in time. If the number of deployments exceeds a predefined threshold, the system can automatically and dynamically change a minimum node pool size in an auto-scaling configuration for the node pool. The minimum node pool size can be changed to a first predetermined value, which can be a number of nodes sufficient to handle an expected maximum number of deployments of the application in the node pool. Increasing the minimum node pool size to the predetermined value can result in the node pool's size being scaled up to that predetermined number of nodes. Although that maximum number of deployments may not actually be running yet on the node pool, this process can prepare the node pool just-in-time for that maximum number of deployments. That way, additional deployments can be added later on with reduced latency. This process can also increase the stability of the node pool as additional deployments are added, thereby preventing the undesired or unpredictable activity associated with existing approaches to auto-scaling. At a later point in time, the number of deployments in the node pool may fall back below the predefined threshold. In response to detecting that the number of deployments in the node pool is below the predefined threshold, the system can automatically and dynamically change the minimum node pool size to a second predetermined value, which is lower than the first predetermined value. This can cause the size of the node pool to be scaled down, thereby avoiding wasting computing resources by having a node pool that is too large for the load.

In one particular example, a computing system can first access a computing cluster. The computing cluster may include a number of nodes on which software can be deployed and executed in various configurations. A node may be, for example, a physical machine or a virtual machine. In some examples, a node is a deployment target for a container. Nodes can be "up" or operating, which refers to a readiness to execute a deployment. In this example, the computing cluster includes a node pool that includes one or more nodes executing one or more deployments. The computing cluster also includes an auto-scaler. The auto-scaler may be used to cause automatic changes to the number of operating nodes in a given node pool or subset of node pools, the number of node pools, the status of the cluster, or some combination thereof. In this example, the auto-scaler is configured to automatically change the number of nodes in the node pool within a particular range at a predetermined rate. For instance, the auto-scaler may be configured to maintain a minimum number of nodes up in the node pool. For each 100% increase in cluster CPU utilization detected, the auto-scaler may be configured to add another node to the node pool, up to a maximum number of nodes. Likewise, for each 100% decrease in cluster CPU utilization detected, the auto-scaler may be configured to stop a node in the node pool, down to the minimum number of nodes. Reliance on this paradigm for cluster auto-scaling, particularly during testing when certain initial conditions are requisite for testing operations, may cause unpredictable test failures.

To overcome the abovementioned problems with the auto-scaler, the computing system can employ the techniques described herein. For instance, the computing system can determine, at a first time, that a first number of deployments are executing in the node pool. The computing system then determines that the first number of deployments meets or exceeds a threshold number of deployments. For example, the cluster may have a default or minimum number of deployments executing when no test is executing. The computing system can determine that the deployment count previously determined exceeds this default deployment count. In response to this determination, the computing system updates the minimum setting of the auto-scaling configuration for the node pool to a predefined value. For example, the predefined value may be a number of nodes sufficient for executing a predefined number of deployments. Because the minimum number of nodes in the node pool has been increased, the auto-scaler may, in a short period of time, start a number of additional nodes in the node pool to bring the number of up nodes to the new minimum. Later on, the computing system may again determine a number of deployments executing on the node pool. The computing system now determines that the number of deployments has dropped below the threshold number of deployments. In response, the computing system again updates the minimum setting of the auto-scaling configuration for the node pool to a second predefined value, the second predefined value being a second number of nodes sufficient for executing at least the threshold number of deployments. In other words, the computing system reduces the minimum number of nodes in the node pool to a reduced lower minimum. As a result, when the auto-scaler detects that the increased number of nodes are no longer in use, it can gradually scale the number of operating nodes down according to the normal operation of the auto-scaler.

These illustrative examples are given to introduce the reader to the general subject matter discussed here and are not intended to limit the scope of the disclosed concepts. The following sections describe various additional features and examples with reference to the drawings in which like numerals indicate like elements but, like the illustrative examples, should not be used to limit the present disclosure.

FIG. 1 is a block diagram that provides an illustration of the hardware components of a data transmission network 100, according to embodiments of the present technology.

Data transmission network 100 is a specialized computer system that may be used for processing large amounts of data where a large number of computer processing cycles are required.

Data transmission network 100 may also include computing environment 114. Computing environment 114 may be a specialized computer or other machine that processes the data received within the data transmission network 100. Data transmission network 100 also includes one or more network devices 102. Network devices 102 may include client devices that attempt to communicate with computing environment 114. For example, network devices 102 may send data to the computing environment 114 to be processed, may send signals to the computing environment 114 to control different aspects of the computing environment or the data it is processing, among other reasons. Network devices 102 may interact with the computing environment 114 through a number of ways, such as, for example, over one or more networks 108. As shown in FIG. 1, computing environment 114 may include one or more other systems. For example, computing environment 114 may include a database system 118 and/or a communications grid 120.

Figure 8:
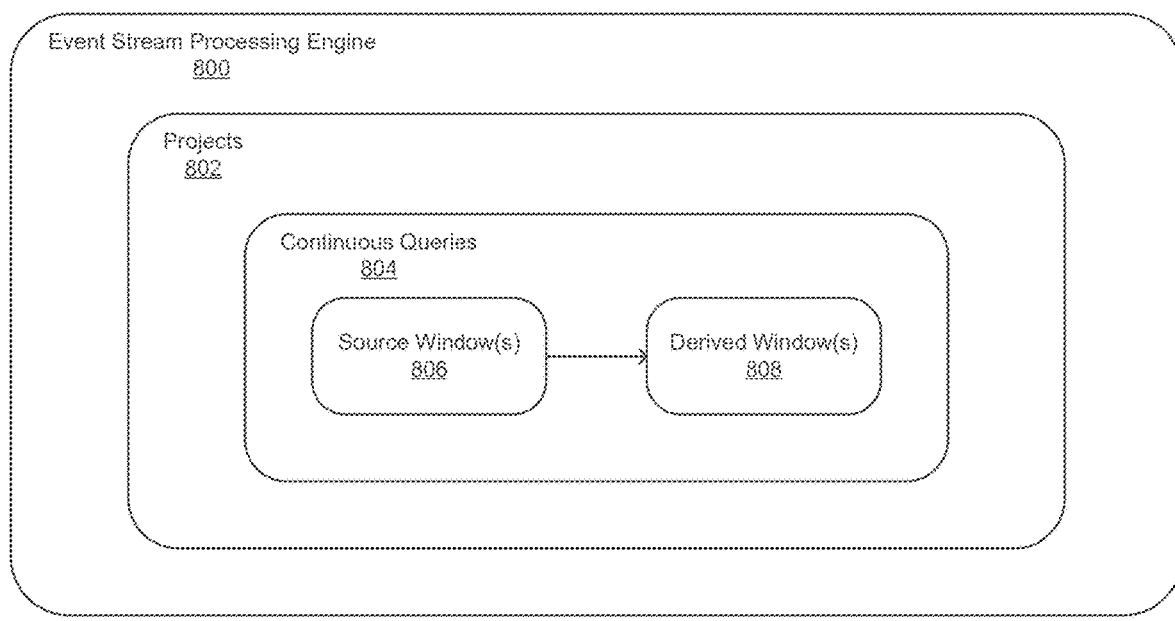
FIG. 8 shows a block diagram including components of an Event Stream Processing Engine (ESPE) according to some aspects of the present disclosure.
Figure 9:
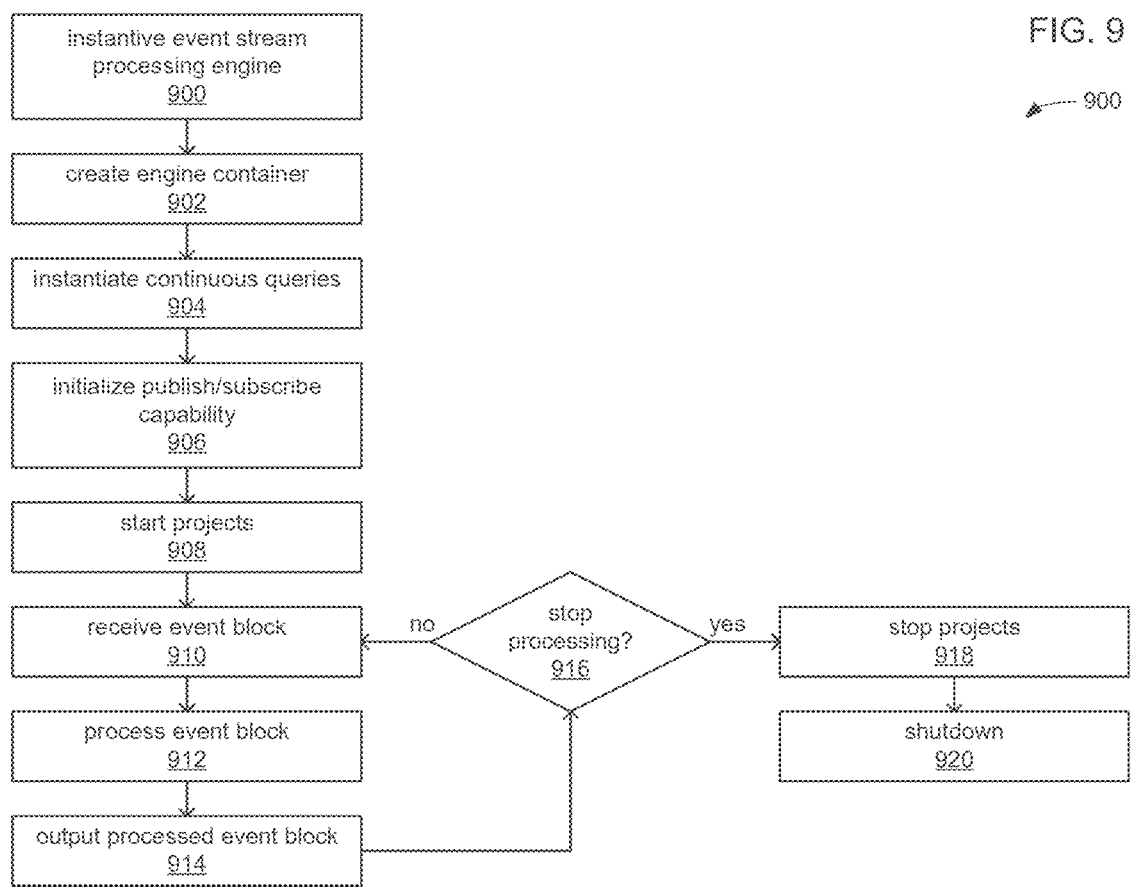
FIG. 9 shows a flow chart of an example process including operations performed by an event stream processing engine according to some aspects of the present disclosure.
Figure 10:
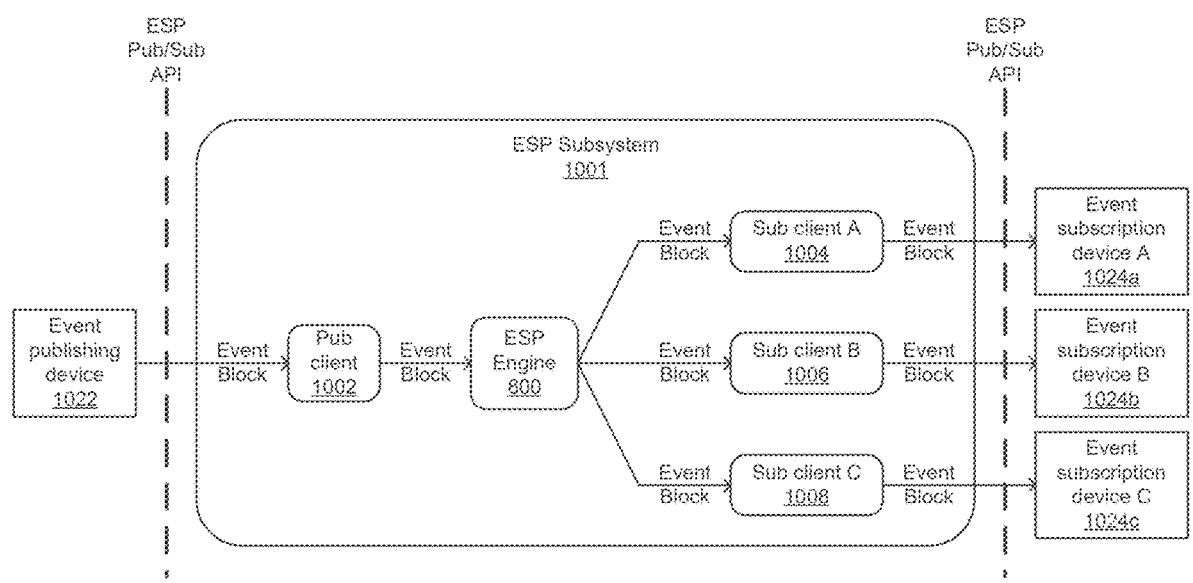
FIG. 10 shows an ESP system interfacing between publishing device and event subscribing devices according to some aspects of the present disclosure.

In other embodiments, network devices 102 may provide a large amount of data, either all at once or streaming over a period of time (e.g., using event stream processing (ESP), described further with respect to FIGS. 8-10), to the computing environment 114 via networks 108. For example, network devices 102 may include network computers, sensors, databases, or other devices that may transmit or otherwise provide data to computing environment 114. For example, network devices 102 may include local area network devices, such as routers, hubs, switches, or other computer networking devices. These devices may provide a variety of stored or generated data, such as network data or data specific to the network devices themselves. Network devices 102 may also include sensors that monitor their environment or other devices to collect data regarding that environment or those devices, and such network devices may provide data they collect over time. Network devices 102 may also include devices within the internet of things, such as devices within a home automation network. Some of these devices may be referred to as edge devices, and may involve edge computing circuitry. Data may be transmitted by network devices 102 directly to computing environment 114 or to network-attached data stores, such as network-attached data stores 110 for storage so that the data may be retrieved later by the computing environment 114 or other portions of data transmission network 100.

Data transmission network 100 may also include one or more network-attached data stores 110. Network-attached data stores 110 are used to store data to be processed by the computing environment 114 as well as any intermediate or final data generated by the computing system in non-volatile memory. However, in certain embodiments, the configuration of the computing environment 114 allows its operations to be performed such that intermediate and final data results can be stored solely in volatile memory (e.g., RAM), without a requirement that intermediate or final data results be stored to non-volatile types of memory (e.g., disk). This can be useful in certain situations, such as when the computing environment 114 receives ad hoc queries from a user and when responses, which are generated by processing large amounts of data, need to be generated on-the-fly. In this non-limiting situation, the computing environment 114 may be configured to retain the processed information within memory so that responses can be generated for the user at different levels of detail as well as allow a user to interactively query against this information.

Network-attached data stores 110 may store a variety of different types of data organized in a variety of different ways and from a variety of different sources. For example, network-attached data storage may include storage other than primary storage located within computing environment 114 that is directly accessible by processors located therein. Network-attached data storage may include secondary, tertiary or auxiliary storage, such as large hard drives, servers, virtual memory, among other types. Storage devices may include portable or non-portable storage devices, optical storage devices, and various other mediums capable of storing or containing data. A machine-readable storage medium or computer-readable storage medium may include a non-transitory medium in which data can be stored and that does not include carrier waves and/or transitory electronic signals. Examples of a non-transitory medium may include, for example, a magnetic disk or tape, optical storage media such as compact disk or digital versatile disk, flash memory, memory or memory devices. A computer-program product may include code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, and network transmission, among others. Furthermore, the data stores may hold a variety of different types of data. For example, network-attached data stores 110 may hold unstructured (e.g., raw) data, such as manufacturing data (e.g., a database containing records identifying products being manufactured with parameter data for each product, such as colors and models) or product sales databases (e.g., a database containing individual data records identifying details of individual product sales).

The unstructured data may be presented to the computing environment 114 in different forms such as a flat file or a conglomerate of data records, and may have data values and accompanying time stamps. The computing environment 114 may be used to analyze the unstructured data in a variety of ways to determine the best way to structure (e.g., hierarchically) that data, such that the structured data is tailored to a type of further analysis that a user wishes to perform on the data. For example, after being processed, the unstructured time stamped data may be aggregated by time (e.g., into daily time period units) to generate time series data and/or structured hierarchically according to one or more dimensions (e.g., parameters, attributes, and/or variables). For example, data may be stored in a hierarchical data structure, such as a ROLAP OR MOLAP database, or may be stored in another tabular form, such as in a flat-hierarchy form.

Data transmission network 100 may also include one or more server farms 106. Computing environment 114 may route select communications or data to the one or more sever farms 106 or one or more servers within the server farms. Server farms 106 can be configured to provide information in a predetermined manner. For example, server farms 106 may access data to transmit in response to a communication. Server farms 106 may be separately housed from each other device within data transmission network 100, such as computing environment 114, and/or may be part of a device or system.

Server farms 106 may host a variety of different types of data processing as part of data transmission network 100. Server farms 106 may receive a variety of different data from network devices 102, from computing environment 114, from cloud network 116, or from other sources. The data may have been obtained or collected from one or more sensors, as inputs from a control database, or may have been received as inputs from an external system or device. Server farms 106 may assist in processing the data by turning raw data into processed data based on one or more rules implemented by the server farms. For example, sensor data may be analyzed to determine changes in an environment over time or in real-time.

Data transmission network 100 may also include one or more cloud networks 116. Cloud network 116 may include a cloud infrastructure system that provides cloud services. In certain embodiments, services provided by the cloud network 116 may include a host of services that are made available to users of the cloud infrastructure system on demand. Cloud network 116 is shown in FIG. 1 as being connected to computing environment 114 (and therefore having computing environment 114 as its client or user), but cloud network 116 may be connected to or utilized by any of the devices in FIG. 1. Services provided by the cloud network can dynamically scale to meet the needs of its users. The cloud network 116 may include one or more computers, servers, and/or systems. In some embodiments, the computers, servers, and/or systems that make up the cloud network 116 are different from the user's own on-premises computers, servers, and/or systems. For example, the cloud network 116 may host an application, and a user may, via a communication network such as the Internet, on demand, order and use the application.

While each device, server and system in FIG. 1 is shown as a single device, it will be appreciated that multiple devices may instead be used. For example, a set of network devices can be used to transmit various communications from a single user, or remote server may include a server stack. As another example, data may be processed as part of computing environment 114.

Each communication within data transmission network 100 (e.g., between client devices, between servers 106 and computing environment 114 or between a server and a device) may occur over one or more networks 108. Networks 108 may include one or more of a variety of different types of networks, including a wireless network, a wired network, or a combination of a wired and wireless network. Examples of suitable networks include the Internet, a personal area network, a local area network (LAN), a wide area network (WAN), or a wireless local area network (WLAN). A wireless network may include a wireless interface or combination of wireless interfaces. As an example, a network in the one or more networks 108 may include a short-range communication channel, such as a BLUETOOTH® communication channel or a BLUETOOTH® Low Energy communication channel. A wired network may include a wired interface. The wired and/or wireless networks may be implemented using routers, access points, bridges, gateways, or the like, to connect devices in the network 108, as will be further described with respect to FIG. 2. The one or more networks 108 can be incorporated entirely within or can include an intranet, an extranet, or a combination thereof. In one embodiment, communications between two or more systems and/or devices can be achieved by a secure communications protocol, such as secure sockets layer (SSL) or transport layer security (TLS). In addition, data and/or transactional details may be encrypted.

Some aspects may utilize the Internet of Things (IoT), where things (e.g., machines, devices, phones, sensors) can be connected to networks and the data from these things can be collected and processed within the things and/or external to the things. For example, the IoT can include sensors in many different devices, and high value analytics can be applied to identify hidden relationships and drive increased efficiencies. This can apply to both big data analytics and real-time (e.g., ESP) analytics. This will be described further below with respect to FIG. 2.

As noted, computing environment 114 may include a communications grid 120 and a transmission network database system 118. Communications grid 120 may be a grid-based computing system for processing large amounts of data. The transmission network database system 118 may be for managing, storing, and retrieving large amounts of data that are distributed to and stored in the one or more network-attached data stores 110 or other data stores that reside at different locations within the transmission network database system 118. The compute nodes in the grid-based computing system 120 and the transmission network database system 118 may share the same processor hardware, such as processors that are located within computing environment 114.

Figure 2:
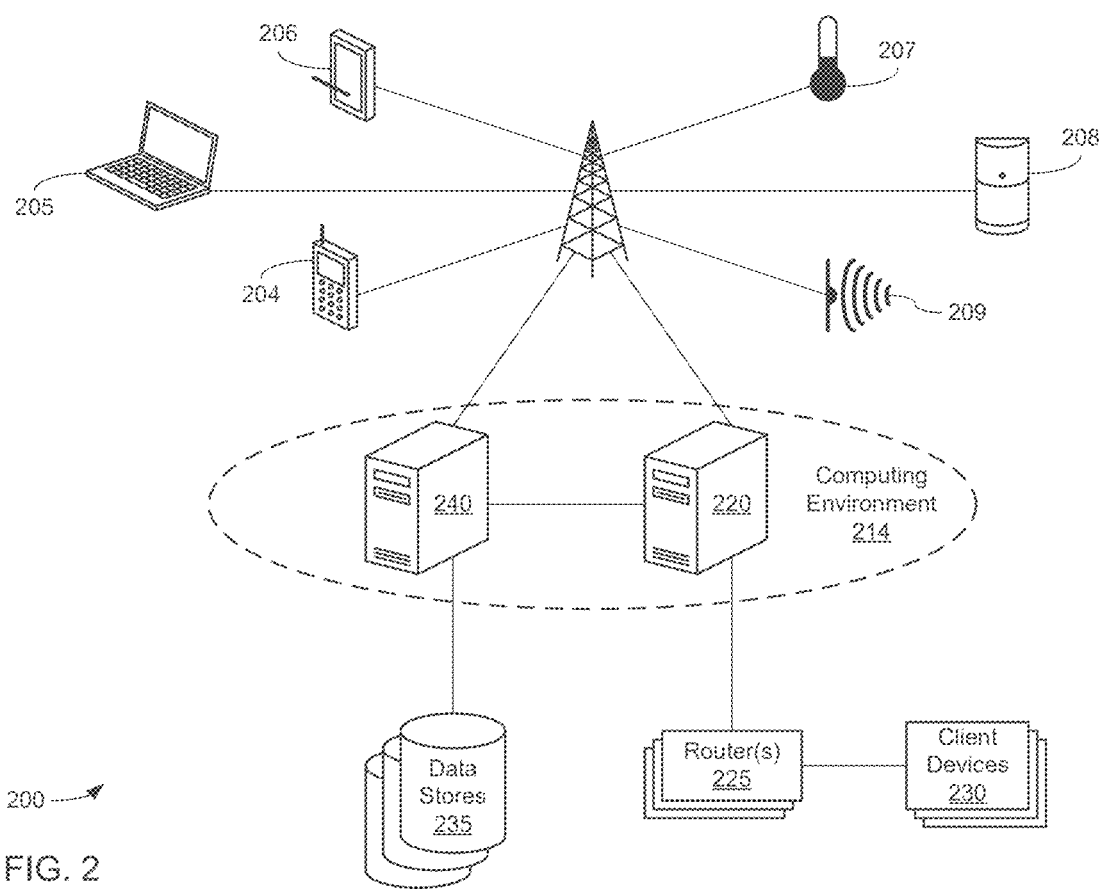
FIG. 2 shows an example network including an example set of devices communicating with each other over an exchange system according to some aspects of the present disclosure.

FIG. 2 illustrates an example network including an example set of devices communicating with each other over an exchange system and via a network, according to embodiments of the present technology. As noted, each communication within data transmission network 100 may occur over one or more networks. System 200 includes a network device 204 configured to communicate with a variety of types of client devices, for example client devices 230, over a variety of types of communication channels.

As shown in FIG. 2, network device 204 can transmit a communication over a network (e.g., a cellular network via a base station). The communication can be routed to another network device, such as network devices 205-209, via base station. The communication can also be routed to computing environment 214 via base station. For example, network device 204 may collect data either from its surrounding environment or from other network devices (such as network devices 205-209) and transmit that data to computing environment 214.

Although network devices 204-209 are shown in FIG. 2 as a mobile phone, laptop computer, tablet computer, temperature sensor, motion sensor, and audio sensor respectively, the network devices may be or include sensors that are sensitive to detecting characteristics of their environment. For example, the network devices may include sensors such as water sensors, power sensors, electrical current sensors, chemical sensors, optical sensors, pressure sensors, geographic or position sensors (e.g., GPS), velocity sensors, acceleration sensors, flow rate sensors, among others. Examples of characteristics that may be sensed include force, torque, load, strain, position, temperature, air pressure, fluid flow, chemical properties, resistance, electromagnetic fields, radiation, irradiance, proximity, acoustics, moisture, distance, speed, vibrations, acceleration, electrical potential, and electrical current, among others. The sensors may be mounted to various components used as part of a variety of different types of systems (e.g., an oil drilling operation). The network devices may detect and record data related to the environment that it monitors, and transmit that data to computing environment 214.

As noted, one type of system that may include various sensors that collect data to be processed and/or transmitted to a computing environment according to certain embodiments includes an oil drilling system. For example, the one or more drilling operation sensors may include surface sensors that measure a hook load, a fluid rate, a temperature and a density in and out of the wellbore, a standpipe pressure, a surface torque, a rotation speed of a drill pipe, a rate of penetration, a mechanical specific energy, etc., and downhole sensors that measure a rotation speed of a bit, fluid densities, downhole torque, downhole vibration (axial, tangential, lateral), a weight applied at a drill bit, an annular pressure, a differential pressure, an azimuth, an inclination, a dog leg severity, a measured depth, a vertical depth, a downhole temperature, etc. Besides the raw data collected directly by the sensors, other data may include parameters either developed by the sensors or assigned to the system by a client or other controlling device. For example, one or more drilling operation control parameters may control settings such as a mud motor speed to flow ratio, a bit diameter, a predicted formation top, seismic data, weather data, etc. Other data may be generated using physical models such as an earth model, a weather model, a seismic model, a bottom hole assembly model, a well plan model, an annular friction model, etc. In addition to sensor and control settings, predicted outputs, of for example, the rate of penetration, mechanical specific energy, hook load, flow in fluid rate, flow out fluid rate, pump pressure, surface torque, rotation speed of the drill pipe, annular pressure, annular friction pressure, annular temperature, equivalent circulating density, etc. may also be stored in the data warehouse.

In another example, another type of system that may include various sensors that collect data to be processed and/or transmitted to a computing environment according to certain embodiments includes a home automation or similar automated network in a different environment, such as an office space, school, public space, sports venue, or a variety of other locations. Network devices in such an automated network may include network devices that allow a user to access, control, and/or configure various home appliances located within the user's home (e.g., a television, radio, light, fan, humidifier, sensor, microwave, iron, and/or the like), or outside of the user's home (e.g., exterior motion sensors, exterior lighting, garage door openers, sprinkler systems, or the like). For example, network device 102 may include a home automation switch that may be coupled with a home appliance. In another embodiment, a network device can allow a user to access, control, and/or configure devices, such as office-related devices (e.g., copy machine, printer, or fax machine), audio and/or video related devices (e.g., a receiver, a speaker, a projector, a DVD player, or a television), media-playback devices (e.g., a compact disc player, a CD player, or the like), computer systems (e.g., a home computer, a laptop computer, a tablet, a personal digital assistant (PDA), a computer system, or a wearable device), lighting devices (e.g., a lamp or recessed lighting), devices associated with a security system, devices associated with an alarm system, devices that can be operated in an automobile (e.g., radio devices, navigation devices), and/or the like. Data may be collected from such various sensors in raw form, or data may be processed by the sensors to create parameters or other data either developed by the sensors based on the raw data or assigned to the system by a client or other controlling device.

In another example, another type of system that may include various sensors that collect data to be processed and/or transmitted to a computing environment according to certain embodiments includes a power or energy grid. A variety of different network devices may be included in an energy grid, such as various devices within one or more power plants, energy farms (e.g., wind farm, solar farm, among others) energy storage facilities, factories, homes and businesses of consumers, among others. One or more of such devices may include one or more sensors that detect energy gain or loss, electrical input or output or loss, and a variety of other efficiencies. These sensors may collect data to inform users of how the energy grid, and individual devices within the grid, may be functioning and how they may be made more efficient.

Network device sensors may also perform processing on data they collect before transmitting the data to the computing environment 114, or before deciding whether to transmit data to the computing environment 114. For example, network devices may determine whether data collected meets certain rules, for example by comparing data or values calculated from the data and comparing that data to one or more thresholds. The network device may use this data and/or comparisons to determine if the data should be transmitted to the computing environment 214 for further use or processing.

Computing environment 214 may include machines 220 and 240. Although computing environment 214 is shown in FIG. 2 as having two machines, 220 and 240, computing environment 214 may have only one machine or may have more than two machines. The machines that make up computing environment 214 may include specialized computers, servers, or other machines that are configured to individually and/or collectively process large amounts of data. The computing environment 214 may also include storage devices that include one or more databases of structured data, such as data organized in one or more hierarchies, or unstructured data. The databases may communicate with the processing devices within computing environment 214 to distribute data to them. Since network devices may transmit data to computing environment 214, that data may be received by the computing environment 214 and subsequently stored within those storage devices. Data used by computing environment 214 may also be stored in data stores 235, which may also be a part of or connected to computing environment 214.

Computing environment 214 can communicate with various devices via one or more routers 225 or other inter-network or intra-network connection components. For example, computing environment 214 may communicate with client devices 230 via one or more routers 225. Computing environment 214 may collect, analyze and/or store data from or pertaining to communications, client device operations, client rules, and/or user-associated actions stored at one or more data stores 235. Such data may influence communication routing to the devices within computing environment 214, how data is stored or processed within computing environment 214, among other actions.

Notably, various other devices can further be used to influence communication routing and/or processing between devices within computing environment 214 and with devices outside of computing environment 214. For example, as shown in FIG. 2, computing environment 214 may include a machine 240 that is a web server. Thus, computing environment 214 can retrieve data of interest, such as client information (e.g., product information, client rules, etc.), technical product details, news, current or predicted weather, and so on.

In addition to computing environment 214 collecting data (e.g., as received from network devices, such as sensors, and client devices or other sources) to be processed as part of a big data analytics project, it may also receive data in real time as part of a streaming analytics environment. As noted, data may be collected using a variety of sources as communicated via different kinds of networks or locally. Such data may be received on a real-time streaming basis. For example, network devices may receive data periodically from network device sensors as the sensors continuously sense, monitor and track changes in their environments. Devices within computing environment 214 may also perform pre-analysis on data it receives to determine if the data received should be processed as part of an ongoing project. The data received and collected by computing environment 214, no matter what the source or method or timing of receipt, may be processed over a period of time for a client to determine results data based on the client's needs and rules.

Figure 3:
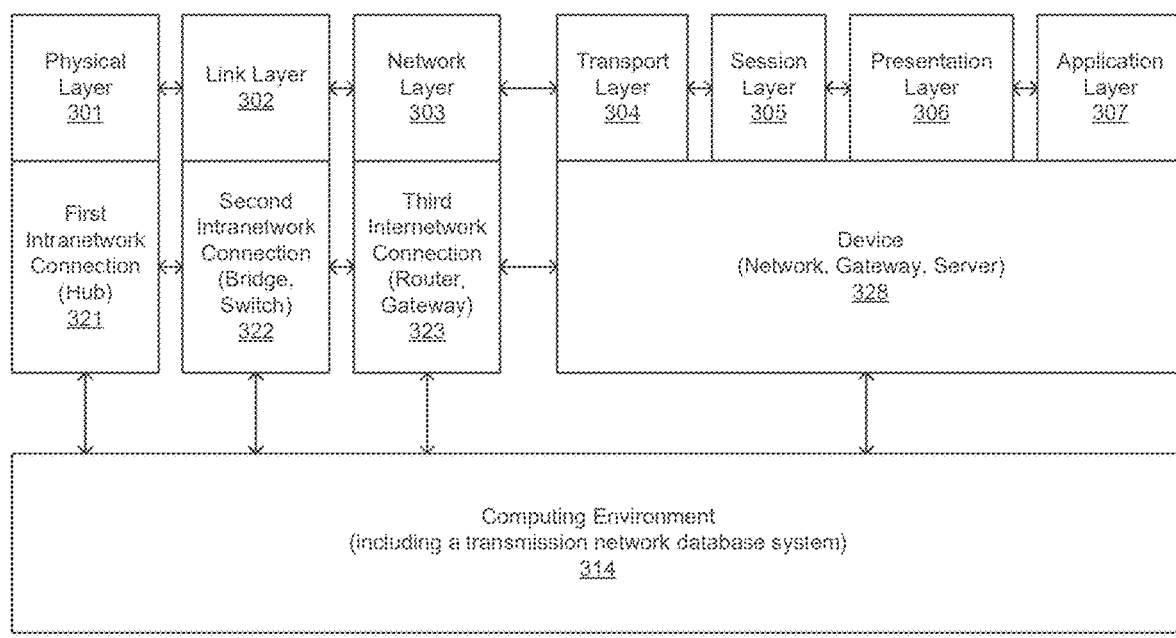
FIG. 3 shows an example representation of a conceptual model of a communications protocol system according to some aspects of the present disclosure.

FIG. 3 illustrates a representation of a conceptual model of a communications protocol system, according to embodiments of the present technology. More specifically, FIG. 3 identifies operation of a computing environment in an Open Systems Interaction model that corresponds to various connection components. The model 300 shows, for example, how a computing environment, such as computing environment 314 (or computing environment 214 in FIG. 2) may communicate with other devices in its network, and control how communications between the computing environment and other devices are executed and under what conditions.

The model can include layers 301-307. The layers are arranged in a stack. Each layer in the stack serves the layer one level higher than it (except for the application layer, which is the highest layer), and is served by the layer one level below it (except for the physical layer, which is the lowest layer). The physical layer is the lowest layer because it receives and transmits raw bites of data, and is the farthest layer from the user in a communications system. On the other hand, the application layer is the highest layer because it interacts directly with a software application.

As noted, the model includes a physical layer 301. Physical layer 301 represents physical communication, and can define parameters of that physical communication. For example, such physical communication may come in the form of electrical, optical, or electromagnetic signals. Physical layer 301 also defines protocols that may control communications within a data transmission network.

Link layer 302 defines links and mechanisms used to transmit (i.e., move) data across a network. The link layer 302 manages node-to-node communications, such as within a grid computing environment. Link layer 302 can detect and correct errors (e.g., transmission errors in the physical layer 301). Link layer 302 can also include a media access control (MAC) layer and logical link control (LLC) layer.

Network layer 303 defines the protocol for routing within a network. In other words, the network layer coordinates transferring data across nodes in a same network (e.g., such as a grid computing environment). Network layer 303 can also define the processes used to structure local addressing within the network.

Transport layer 304 can manage the transmission of data and the quality of the transmission and/or receipt of that data. Transport layer 304 can provide a protocol for transferring data, such as, for example, a Transmission Control Protocol (TCP). Transport layer 304 can assemble and disassemble data frames for transmission. The transport layer can also detect transmission errors occurring in the layers below it.

Session layer 305 can establish, maintain, and manage communication connections between devices on a network. In other words, the session layer controls the dialogues or nature of communications between network devices on the network. The session layer may also establish checkpointing, adjournment, termination, and restart procedures.

Presentation layer 306 can provide translation for communications between the application and network layers. In other words, this layer may encrypt, decrypt and/or format data based on data types and/or encodings known to be accepted by an application or network layer.

Application layer 307 interacts directly with software applications and end users, and manages communications between them. Application layer 307 can identify destinations, local resource states or availability and/or communication content or formatting using the applications.

Intra-network connection components 321 and 322 are shown to operate in lower levels, such as physical layer 301 and link layer 302, respectively. For example, a hub can operate in the physical layer, a switch can operate in the link layer, and a router can operate in the network layer. Inter-network connection components 323 and 328 are shown to operate on higher levels, such as layers 303-307. For example, routers can operate in the network layer and network devices can operate in the transport, session, presentation, and application layers.

As noted, a computing environment 314 can interact with and/or operate on, in various embodiments, one, more, all or any of the various layers. For example, computing environment 314 can interact with a hub (e.g., via the link layer) so as to adjust which devices the hub communicates with. The physical layer may be served by the link layer, so it may implement such data from the link layer. For example, the computing environment 314 may control which devices it will receive data from. For example, if the computing environment 314 knows that a certain network device has turned off, broken, or otherwise become unavailable or unreliable, the computing environment 314 may instruct the hub to prevent any data from being transmitted to the computing environment 314 from that network device. Such a process may be beneficial to avoid receiving data that is inaccurate or that has been influenced by an uncontrolled environment. As another example, computing environment 314 can communicate with a bridge, switch, router or gateway and influence which device within the system (e.g., system 200) the component selects as a destination. In some embodiments, computing environment 314 can interact with various layers by exchanging communications with equipment operating on a particular layer by routing or modifying existing communications. In another embodiment, such as in a grid computing environment, a node may determine how data within the environment should be routed (e.g., which node should receive certain data) based on certain parameters or information provided by other layers within the model.

As noted, the computing environment 314 may be a part of a communications grid environment, the communications of which may be implemented as shown in the protocol of FIG. 3. For example, referring back to FIG. 2, one or more of machines 220 and 240 may be part of a communications grid computing environment. A gridded computing environment may be employed in a distributed system with non-interactive workloads where data resides in memory on the machines, or compute nodes. In such an environment, analytic code, instead of a database management system, controls the processing performed by the nodes. Data is co-located by pre-distributing it to the grid nodes, and the analytic code on each node loads the local data into memory. Each node may be assigned a particular task such as a portion of a processing project, or to organize or control other nodes within the grid.

Figure 4:
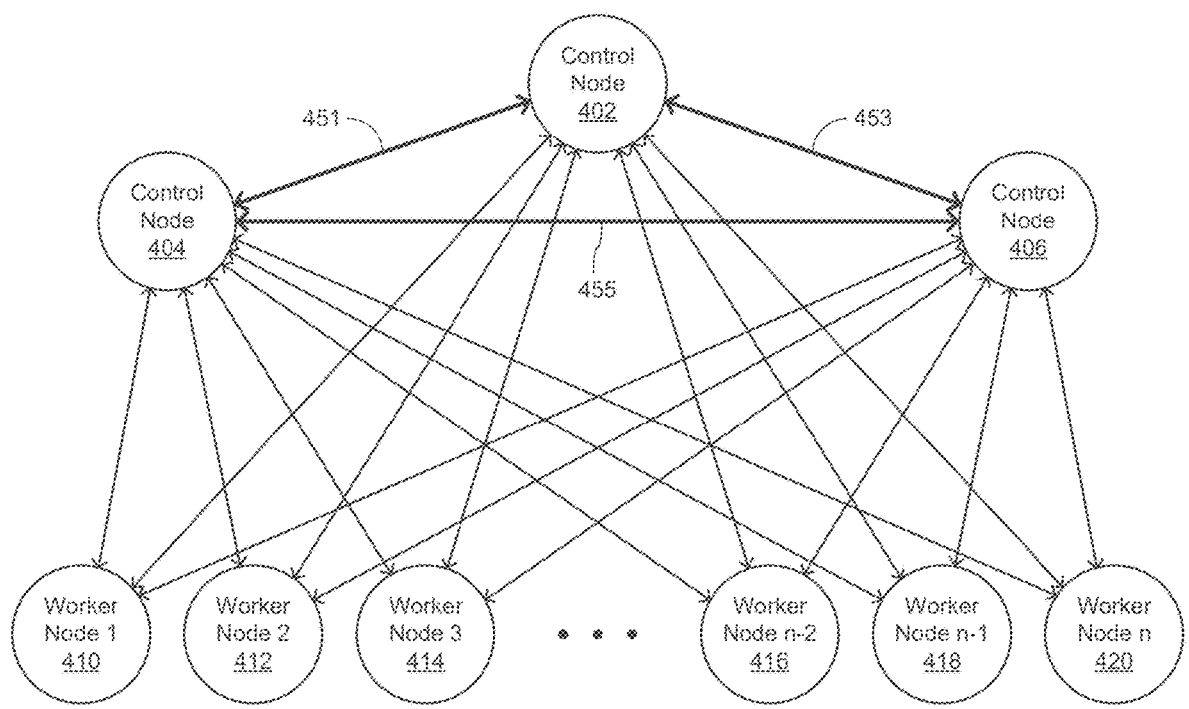
FIG. 4 shows a communications grid computing system including a variety of control and worker nodes according to some aspects of the present disclosure.

FIG. 4 illustrates a communications grid computing system 400 including a variety of control and worker nodes, according to embodiments of the present technology. Communications grid computing system 400 includes three control nodes and one or more worker nodes. Communications grid computing system 400 includes control nodes 402, 404, and 406. The control nodes are communicatively connected via communication paths 451, 453, and 455. Therefore, the control nodes may transmit information (e.g., related to the communications grid or notifications), to and receive information from each other. Although communications grid computing system 400 is shown in FIG. 4 as including three control nodes, the communications grid may include more or less than three control nodes.

Communications grid computing system (or just "communications grid") 400 also includes one or more worker nodes. Shown in FIG. 4 are six worker nodes 410-420. Although FIG. 4 shows six worker nodes, a communications grid according to embodiments of the present technology may include more or less than six worker nodes. The number of worker nodes included in a communications grid may be dependent upon how large the project or data set is being processed by the communications grid, the capacity of each worker node, the time designated for the communications grid to complete the project, among others. Each worker node within the communications grid 400 may be connected (wired or wirelessly, and directly or indirectly) to control nodes 402-406. Therefore, each worker node may receive information from the control nodes (e.g., an instruction to perform work on a project) and may transmit information to the control nodes (e.g., a result from work performed on a project). Furthermore, worker nodes may communicate with each other (either directly or indirectly). For example, worker nodes may transmit data between each other related to a job being performed or an individual task within a job being performed by that worker node. However, in certain embodiments, worker nodes may not, for example, be connected (communicatively or otherwise) to certain other worker nodes. In an embodiment, worker nodes may only be able to communicate with the control node that controls it, and may not be able to communicate with other worker nodes in the communications grid, whether they are other worker nodes controlled by the control node that controls the worker node, or worker nodes that are controlled by other control nodes in the communications grid.

A control node may connect with an external device with which the control node may communicate (e.g., a grid user, such as a server or computer, may connect to a controller of the grid). For example, a server or computer may connect to control nodes and may transmit a project or job to the node. The project may include a data set. The data set may be of any size. Once the control node receives such a project including a large data set, the control node may distribute the data set or projects related to the data set to be performed by worker nodes. Alternatively, for a project including a large data set, the data set may be received or stored by a machine other than a control node (e.g., a HADOOP® standard-compliant data node employing the HADOOP® Distributed File System, or HDFS).

Control nodes may maintain knowledge of the status of the nodes in the grid (i.e., grid status information), accept work requests from clients, subdivide the work across worker nodes, and coordinate the worker nodes, among other responsibilities. Worker nodes may accept work requests from a control node and provide the control node with results of the work performed by the worker node. A grid may be started from a single node (e.g., a machine, computer, server, etc.). This first node may be assigned or may start as the primary control node that will control any additional nodes that enter the grid.

When a project is submitted for execution (e.g., by a client or a controller of the grid) it may be assigned to a set of nodes. After the nodes are assigned to a project, a data structure (i.e., a communicator) may be created. The communicator may be used by the project for information to be shared between the project codes running on each node. A communication handle may be created on each node. A handle, for example, is a reference to the communicator that is valid within a single process on a single node, and the handle may be used when requesting communications between nodes.

A control node, such as control node 402, may be designated as the primary control node. A server, computer or other external device may connect to the primary control node. Once the control node receives a project, the primary control node may distribute portions of the project to its worker nodes for execution. For example, when a project is initiated on communications grid 400, primary control node 402 controls the work to be performed for the project in order to complete the project as requested or instructed. The primary control node may distribute work to the worker nodes based on various factors, such as which subsets or portions of projects may be completed most efficiently and in the correct amount of time. For example, a worker node may perform analysis on a portion of data that is already local to (e.g., stored on) the worker node. The primary control node also coordinates and processes the results of the work performed by each worker node after each worker node executes and completes its job. For example, the primary control node may receive a result from one or more worker nodes, and the control node may organize (e.g., collect and assemble) the results received and compile them to produce a complete result for the project received from the end user.

Any remaining control nodes, such as control nodes 404 and 406, may be assigned as backup control nodes for the project. In an embodiment, backup control nodes may not control any portion of the project. Instead, backup control nodes may serve as a backup for the primary control node and take over as primary control node if the primary control node were to fail. If a communications grid were to include only a single control node, and the control node were to fail (e.g., the control node is shut off or breaks), then the communications grid as a whole may fail and any project or job being run on the communications grid may fail and may not complete. While the project may be run again, such a failure may cause a delay (severe delay in some cases, such as overnight delay) in completion of the project. Therefore, a grid with multiple control nodes, including a backup control node, may be beneficial.

To add another node or machine to the grid, the primary control node may open a pair of listening sockets, for example. A socket may be used to accept work requests from clients, and the second socket may be used to accept connections from other grid nodes. The primary control node may be provided with a list of other nodes (e.g., other machines, computers, servers) that will participate in the grid, and the role that each node will fill in the grid. Upon startup of the primary control node (e.g., the first node on the grid), the primary control node may use a network protocol to start the server process on every other node in the grid. Command line parameters, for example, may inform each node of one or more pieces of information, such as: the role that the node will have in the grid, the host name of the primary control node, and the port number on which the primary control node is accepting connections from peer nodes, among others. The information may also be provided in a configuration file, transmitted over a secure shell tunnel, or received from a configuration server, among others. While the other machines in the grid may not initially know about the configuration of the grid, that information may also be sent to each other node by the primary control node. Updates of the grid information may also be subsequently sent to those nodes.

For any control node other than the primary control node added to the grid, the control node may open three sockets. The first socket may accept work requests from clients, the second socket may accept connections from other grid members, and the third socket may connect (e.g., permanently) to the primary control node. When a control node (e.g., primary control node) receives a connection from another control node, it first checks to see if the peer node is in the list of configured nodes in the grid. If it is not on the list, the control node may clear the connection. If it is on the list, it may then attempt to authenticate the connection. If authentication is successful, the authenticating node may transmit information to its peer, such as the port number on which a node is listening for connections, the host name of the node, and information about how to authenticate the node, among other information. When a node, such as the new control node, receives information about another active node, it will check to see if it already has a connection to that other node. If it does not have a connection to that node, it may then establish a connection to that control node.

Any worker node added to the grid may establish a connection to the primary control node and any other control nodes on the grid. After establishing the connection, it may authenticate itself to the grid (e.g., any control nodes, including both primary and backup, or a server or user controlling the grid). After successful authentication, the worker node may accept configuration information from the control node.

When a node joins a communications grid (e.g., when the node is powered on or connected to an existing node on the grid or both), the node is assigned (e.g., by an operating system of the grid) a universally unique identifier (UUID). This unique identifier may help other nodes and external entities (devices, users, etc.) to identify the node and distinguish it from other nodes. When a node is connected to the grid, the node may share its unique identifier with the other nodes in the grid. Since each node may share its unique identifier, each node may know the unique identifier of every other node on the grid. Unique identifiers may also designate a hierarchy of each of the nodes (e.g., backup control nodes) within the grid. For example, the unique identifiers of each of the backup control nodes may be stored in a list of backup control nodes to indicate an order in which the backup control nodes will take over for a failed primary control node to become a new primary control node. However, a hierarchy of nodes may also be determined using methods other than using the unique identifiers of the nodes. For example, the hierarchy may be predetermined, or may be assigned based on other predetermined factors.

The grid may add new machines at any time (e.g., initiated from any control node). Upon adding a new node to the grid, the control node may first add the new node to its table of grid nodes. The control node may also then notify every other control node about the new node. The nodes receiving the notification may acknowledge that they have updated their configuration information.

Primary control node 402 may, for example, transmit one or more communications to backup control nodes 404 and 406 (and, for example, to other control or worker nodes within the communications grid). Such communications may be sent periodically, at fixed time intervals, between known fixed stages of the project's execution, among other protocols. The communications transmitted by primary control node 402 may be of varied types and may include a variety of types of information. For example, primary control node 402 may transmit snapshots (e.g., status information) of the communications grid so that backup control node 404 always has a recent snapshot of the communications grid. The snapshot or grid status may include, for example, the structure of the grid (including, for example, the worker nodes in the grid, unique identifiers of the nodes, or their relationships with the primary control node) and the status of a project (including, for example, the status of each worker node's portion of the project). The snapshot may also include analysis or results received from worker nodes in the communications grid. The backup control nodes may receive and store the backup data received from the primary control node. The backup control nodes may transmit a request for such a snapshot (or other information) from the primary control node, or the primary control node may send such information periodically to the backup control nodes.

As noted, the backup data may allow the backup control node to take over as primary control node if the primary control node fails without requiring the grid to start the project over from scratch. If the primary control node fails, the backup control node that will take over as primary control node may retrieve the most recent version of the snapshot received from the primary control node and use the snapshot to continue the project from the stage of the project indicated by the backup data. This may prevent failure of the project as a whole.

A backup control node may use various methods to determine that the primary control node has failed. In one example of such a method, the primary control node may transmit (e.g., periodically) a communication to the backup control node that indicates that the primary control node is working and has not failed, such as a heartbeat communication. The backup control node may determine that the primary control node has failed if the backup control node has not received a heartbeat communication for a certain predetermined period of time. Alternatively, a backup control node may also receive a communication from the primary control node itself (before it failed) or from a worker node that the primary control node has failed, for example because the primary control node has failed to communicate with the worker node.

Different methods may be performed to determine which backup control node of a set of backup control nodes (e.g., backup control nodes 404 and 406) will take over for failed primary control node 402 and become the new primary control node. For example, the new primary control node may be chosen based on a ranking or "hierarchy" of backup control nodes based on their unique identifiers. In an alternative embodiment, a backup control node may be assigned to be the new primary control node by another device in the communications grid or from an external device (e.g., a system infrastructure or an end user, such as a server or computer, controlling the communications grid). In another alternative embodiment, the backup control node that takes over as the new primary control node may be designated based on bandwidth or other statistics about the communications grid.

A worker node within the communications grid may also fail. If a worker node fails, work being performed by the failed worker node may be redistributed amongst the operational worker nodes. In an alternative embodiment, the primary control node may transmit a communication to each of the operable worker nodes still on the communications grid that each of the worker nodes should purposefully fail also. After each of the worker nodes fail, they may each retrieve their most recent saved checkpoint of their status and re-start the project from that checkpoint to minimize lost progress on the project being executed.

Figure 5:
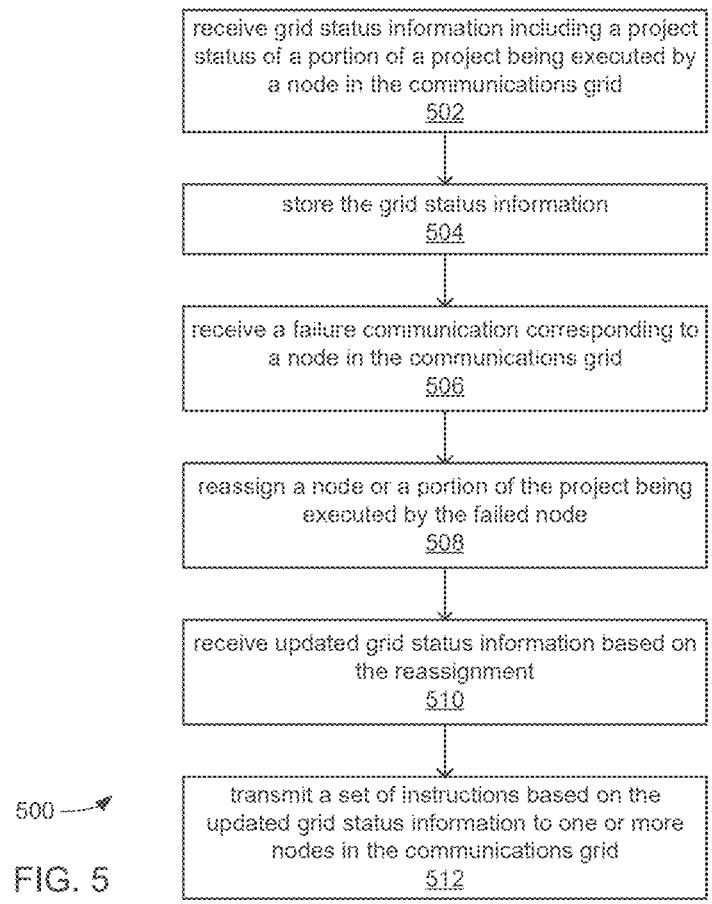
FIG. 5 shows a flow chart showing an example process for adjusting a communications grid or a work project in a communications grid after a failure of a node according to some aspects of the present disclosure.

FIG. 5 illustrates a flow chart showing an example process 500 for adjusting a communications grid or a work project in a communications grid after a failure of a node, according to embodiments of the present technology. The process may include, for example, receiving grid status information including a project status of a portion of a project being executed by a node in the communications grid, as described in operation 502. For example, a control node (e.g., a backup control node connected to a primary control node and a worker node on a communications grid) may receive grid status information, where the grid status information includes a project status of the primary control node or a project status of the worker node. The project status of the primary control node and the project status of the worker node may include a status of one or more portions of a project being executed by the primary and worker nodes in the communications grid. The process may also include storing the grid status information, as described in operation 504. For example, a control node (e.g., a backup control node) may store the received grid status information locally within the control node. Alternatively, the grid status information may be sent to another device for storage where the control node may have access to the information.

The process may also include receiving a failure communication corresponding to a node in the communications grid in operation 506. For example, a node may receive a failure communication including an indication that the primary control node has failed, prompting a backup control node to take over for the primary control node. In an alternative embodiment, a node may receive a failure that a worker node has failed, prompting a control node to reassign the work being performed by the worker node. The process may also include reassigning a node or a portion of the project being executed by the failed node, as described in operation 508. For example, a control node may designate the backup control node as a new primary control node based on the failure communication upon receiving the failure communication. If the failed node is a worker node, a control node may identify a project status of the failed worker node using the snapshot of the communications grid, where the project status of the failed worker node includes a status of a portion of the project being executed by the failed worker node at the failure time.

The process may also include receiving updated grid status information based on the reassignment, as described in operation 510, and transmitting a set of instructions based on the updated grid status information to one or more nodes in the communications grid, as described in operation 512. The updated grid status information may include an updated project status of the primary control node or an updated project status of the worker node. The updated information may be transmitted to the other nodes in the grid to update their stale stored information.

Figure 6:
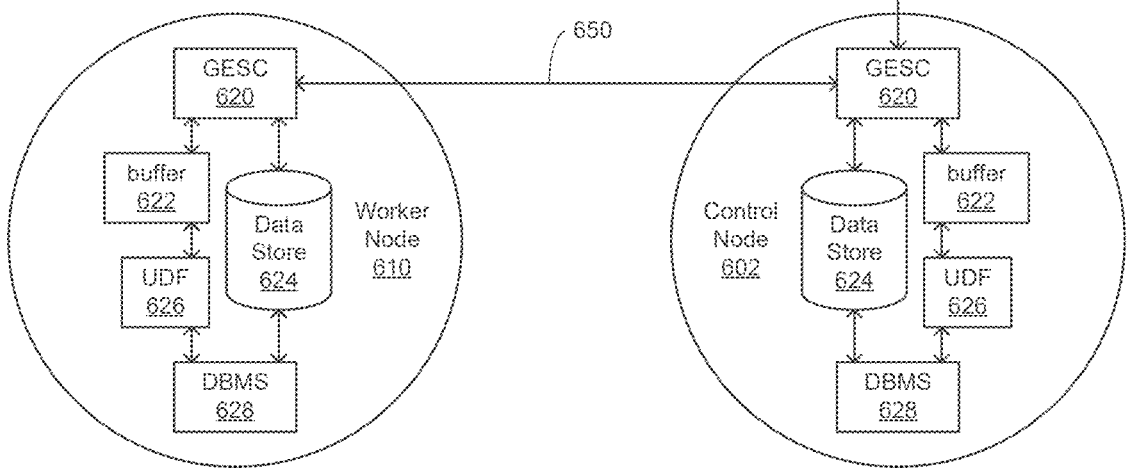
FIG. 6 shows a portion of a communications grid computing system including a control node and a worker node according to some aspects of the present disclosure.

FIG. 6 illustrates a portion of a communications grid computing system 600 including a control node and a worker node, according to embodiments of the present technology. Communications grid computing system 600 includes one control node (control node 602) and one worker node (worker node 610) for purposes of illustration, but may include more worker and/or control nodes. The control node 602 is communicatively connected to worker node 610 via communication path 650. Therefore, control node 602 may transmit information (e.g., related to the communications grid or notifications), to and receive information from worker node 610 via path 650.

Similar to in FIG. 4, communications grid computing system (or just "communications grid") 600 includes data processing nodes (control node 602 and worker node 610). Nodes 602 and 610 include multi-core data processors. Each node 602 and 610 includes a grid-enabled software component (GESC) 620 that executes on the data processor associated with that node and interfaces with buffer memory 622 also associated with that node. Each node 602 and 610 includes database management software (DBMS) 628 that executes on a database server (not shown) at control node 602 and on a database server (not shown) at worker node 610.

Each node also includes a data store 624. Data stores 624, similar to network-attached data stores 110 in FIG. 1 and data stores 235 in FIG. 2, are used to store data to be processed by the nodes in the computing environment. Data stores 624 may also store any intermediate or final data generated by the computing system after being processed, for example in non-volatile memory. However in certain embodiments, the configuration of the grid computing environment allows its operations to be performed such that intermediate and final data results can be stored solely in volatile memory (e.g., RAM), without a requirement that intermediate or final data results be stored to non-volatile types of memory. Storing such data in volatile memory may be useful in certain situations, such as when the grid receives queries (e.g., ad hoc) from a client and when responses, which are generated by processing large amounts of data, need to be generated quickly or on-the-fly. In such a situation, the grid may be configured to retain the data within a memory so that responses can be generated at different levels of detail and so that a client may interactively query against this information.

Each node also includes a user-defined function (UDF) 626. The UDF provides a mechanism for the DBMS 628 to transfer data to or receive data from the database stored in the data stores 624 that are managed by the DBMS 628. For example, UDF 626 can be invoked by the DBMS 628 to provide data to the GESC 620 for processing. The UDF 626 may establish a socket connection (not shown) with the GESC 620 to transfer the data. Alternatively, the UDF 626 can transfer data to the GESC 620 by writing data to shared memory accessible by both the UDF 626 and the GESC 620

The GESC 620 at the nodes 602 and 610 may be connected via a network, such as network 108 shown in FIG. 1. Therefore, nodes 602 and 610 can communicate with each other via the network using a predetermined communication protocol such as, for example, the Message Passing Interface (MPI). Each GESC 620 can engage in point-to-point communication with the GESC at another node or in collective communication with multiple GESCs via the network. The GESC 620 at each node may contain identical (or nearly identical) software instructions. Each node may be capable of operating as either a control node or a worker node. The GESC at the control node 602 can communicate, over a communication path 652, with a client device 630. More specifically, control node 602 may communicate with client application 632 hosted by the client device 630 to receive queries and to respond to those queries after processing large amounts of data.

DBMS 628 may control the creation, maintenance, and use of database or data structure (not shown) within a nodes 602 or 610. The database may organize data stored in data stores 624. The DBMS 628 at control node 602 may accept requests for data and transfer the appropriate data for the request. With such a process, collections of data may be distributed across multiple physical locations. In this example, each node 602 and 610 stores a portion of the total data managed by the management system in its associated data store 624.

Furthermore, the DBMS may be responsible for protecting against data loss using replication techniques. Replication includes providing a backup copy of data stored on one node on one or more other nodes. Therefore, if one node fails, the data from the failed node can be recovered from a replicated copy residing at another node. However, as described herein with respect to FIG. 4, data or status information for each node in the communications grid may also be shared with each node on the grid.

Figure 7:
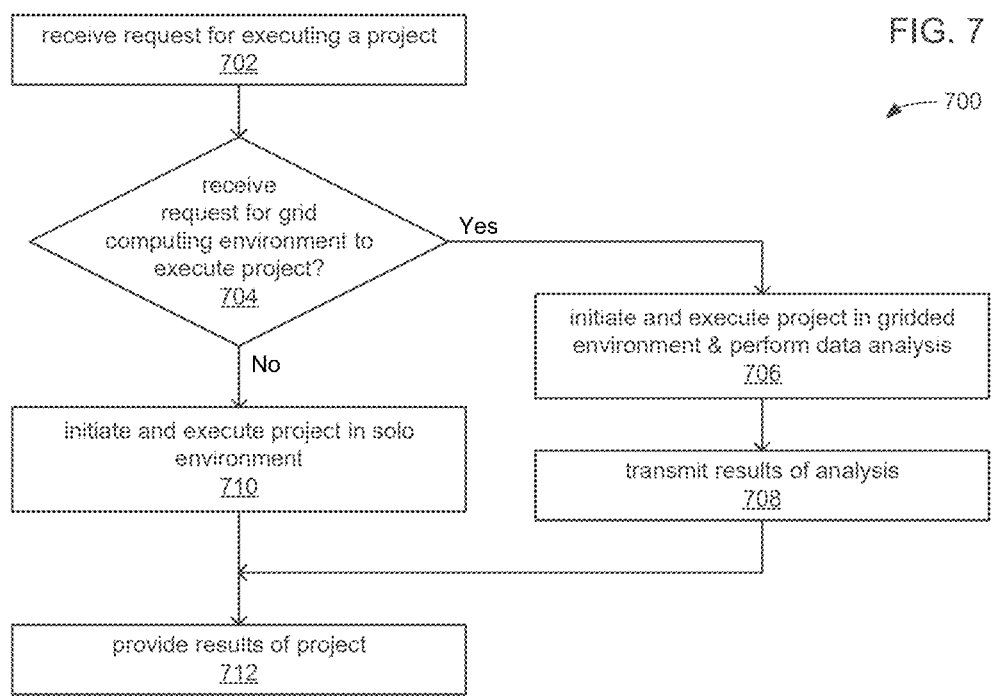
FIG. 7 shows a flow chart showing an example method 700 for executing a project within a grid computing system according to some aspects of the present disclosure.

FIG. 7 illustrates a flow chart showing an example method 700 for executing a project within a grid computing system, according to embodiments of the present technology. As described with respect to FIG. 6, the GESC at the control node may transmit data with a client device (e.g., client device 630) to receive queries for executing a project and to respond to those queries after large amounts of data have been processed. The query may be transmitted to the control node, where the query may include a request for executing a project, as described in operation 702. The query can contain instructions on the type of data analysis to be performed in the project and whether the project should be executed using the grid-based computing environment, as shown in operation 704.

To initiate the project, the control node may determine if the query requests use of the grid-based computing environment to execute the project. If the determination is no, then the control node initiates execution of the project in a solo environment (e.g., at the control node), as described in operation 710. If the determination is yes, the control node may initiate execution of the project in the grid-based computing environment, as described in operation 706. In such a situation, the request may include a requested configuration of the grid. For example, the request may include a number of control nodes and a number of worker nodes to be used in the grid when executing the project. After the project has been completed, the control node may transmit results of the analysis yielded by the grid, as described in operation 708. Whether the project is executed in a solo or grid-based environment, the control node provides the results of the project, as described in operation 712.

As noted with respect to FIG. 2, the computing environments described herein may collect data (e.g., as received from network devices, such as sensors, such as network devices 204-209 in FIG. 2, and client devices or other sources) to be processed as part of a data analytics project, and data may be received in real time as part of a streaming analytics environment (e.g., ESP). Data may be collected using a variety of sources as communicated via different kinds of networks or locally, such as on a real-time streaming basis. For example, network devices may receive data periodically from network device sensors as the sensors continuously sense, monitor and track changes in their environments. More specifically, an increasing number of distributed applications develop or produce continuously flowing data from distributed sources by applying queries to the data before distributing the data to geographically distributed recipients. An event stream processing engine (ESPE) may continuously apply the queries to the data as it is received and determines which entities should receive the data. Client or other devices may also subscribe to the ESPE or other devices processing ESP data so that they can receive data after processing, based on for example the entities determined by the processing engine. For example, client devices 230 in FIG. 2 may subscribe to the ESPE in computing environment 214. In another example, event subscription devices 1024a-c, described further with respect to FIG. 10, may also subscribe to the ESPE. The ESPE may determine or define how input data or event streams from network devices or other publishers (e.g., network devices 204-209 in FIG. 2) are transformed into meaningful output data to be consumed by subscribers, such as for example client devices 230 in FIG. 2.

FIG. 8 illustrates a block diagram including components of an Event Stream Processing Engine (ESPE), according to embodiments of the present technology. ESPE 800 may include one or more projects 802. A project may be described as a second-level container in an engine model managed by ESPE 800 where a thread pool size for the project may be defined by a user. Each project of the one or more projects 802 may include one or more continuous queries 804 that contain data flows, which are data transformations of incoming event streams. The one or more continuous queries 804 may include one or more source windows 806 and one or more derived windows 808.

The ESPE may receive streaming data over a period of time related to certain events, such as events or other data sensed by one or more network devices. The ESPE may perform operations associated with processing data created by the one or more devices. For example, the ESPE may receive data from the one or more network devices 204-209 shown in FIG. 2. As noted, the network devices may include sensors that sense different aspects of their environments, and may collect data over time based on those sensed observations. For example, the ESPE may be implemented within one or more of machines 220 and 240 shown in FIG. 2. The ESPE may be implemented within such a machine by an ESP application. An ESP application may embed an ESPE with its own dedicated thread pool or pools into its application space where the main application thread can do application-specific work and the ESPE processes event streams at least by creating an instance of a model into processing objects.

The engine container is the top-level container in a model that manages the resources of the one or more projects 802. In an illustrative embodiment, for example, there may be only one ESPE 800 for each instance of the ESP application, and ESPE 800 may have a unique engine name. Additionally, the one or more projects 802 may each have unique project names, and each query may have a unique continuous query name and begin with a uniquely named source window of the one or more source windows 806. ESPE 800 may or may not be persistent.

Continuous query modeling involves defining directed graphs of windows for event stream manipulation and transformation. A window in the context of event stream manipulation and transformation is a processing node in an event stream processing model. A window in a continuous query can perform aggregations, computations, pattern-matching, and other operations on data flowing through the window. A continuous query may be described as a directed graph of source, relational, pattern matching, and procedural windows. The one or more source windows 806 and the one or more derived windows 808 represent continuously executing queries that generate updates to a query result set as new event blocks stream through ESPE 800. A directed graph, for example, is a set of nodes connected by edges, where the edges have a direction associated with them.

An event object may be described as a packet of data accessible as a collection of fields, with at least one of the fields defined as a key or unique identifier (ID). The event object may be created using a variety of formats including binary, alphanumeric, XML, etc. Each event object may include one or more fields designated as a primary identifier (ID) for the event so ESPE 800 can support operation codes (opcodes) for events including insert, update, upsert, and delete. Upsert opcodes update the event if the key field already exists; otherwise, the event is inserted. For illustration, an event object may be a packed binary representation of a set of field values and include both metadata and field data associated with an event. The metadata may include an opcode indicating if the event represents an insert, update, delete, or upsert, a set of flags indicating if the event is a normal, partial-update, or a retention generated event from retention policy management, and a set of microsecond timestamps that can be used for latency measurements.

An event block object may be described as a grouping or package of event objects. An event stream may be described as a flow of event block objects. A continuous query of the one or more continuous queries 804 transforms a source event stream made up of streaming event block objects published into ESPE 800 into one or more output event streams using the one or more source windows 806 and the one or more derived windows 808. A continuous query can also be thought of as data flow modeling.

The one or more source windows 806 are at the top of the directed graph and have no windows feeding into them. Event streams are published into the one or more source windows 806, and from there, the event streams may be directed to the next set of connected windows as defined by the directed graph. The one or more derived windows 808 are all instantiated windows that are not source windows and that have other windows streaming events into them. The one or more derived windows 808 may perform computations or transformations on the incoming event streams. The one or more derived windows 808 transform event streams based on the window type (that is operators such as join, filter, compute, aggregate, copy, pattern match, procedural, union, etc.) and window settings. As event streams are published into ESPE 800, they are continuously queried, and the resulting sets of derived windows in these queries are continuously updated.

FIG. 9 illustrates a flow chart showing an example process including operations performed by an event stream processing engine, according to some embodiments of the present technology. As noted, the ESPE 800 (or an associated ESP application) defines how input event streams are transformed into meaningful output event streams. More specifically, the ESP application may define how input event streams from publishers (e.g., network devices providing sensed data) are transformed into meaningful output event streams consumed by subscribers (e.g., a data analytics project being executed by a machine or set of machines).

Within the application, a user may interact with one or more user interface windows presented to the user in a display under control of the ESPE independently or through a browser application in an order selectable by the user. For example, a user may execute an ESP application, which causes presentation of a first user interface window, which may include a plurality of menus and selectors such as drop down menus, buttons, text boxes, hyperlinks, etc. associated with the ESP application as understood by a person of skill in the art. As further understood by a person of skill in the art, various operations may be performed in parallel, for example, using a plurality of threads.

At operation 900, an ESP application may define and start an ESPE, thereby instantiating an ESPE at a device, such as machine 220 and/or 240. In an operation 902, the engine container is created. For illustration, ESPE 800 may be instantiated using a function call that specifies the engine container as a manager for the model.

In an operation 904, the one or more continuous queries 804 are instantiated by ESPE 800 as a model. The one or more continuous queries 804 may be instantiated with a dedicated thread pool or pools that generate updates as new events stream through ESPE 800. For illustration, the one or more continuous queries 804 may be created to model business processing logic within ESPE 800, to predict events within ESPE 800, to model a physical system within ESPE 800, to predict the physical system state within ESPE 800, etc. For example, as noted, ESPE 800 may be used to support sensor data monitoring and management (e.g., sensing may include force, torque, load, strain, position, temperature, air pressure, fluid flow, chemical properties, resistance, electromagnetic fields, radiation, irradiance, proximity, acoustics, moisture, distance, speed, vibrations, acceleration, electrical potential, or electrical current, etc.).

ESPE 800 may analyze and process events in motion or "event streams." Instead of storing data and running queries against the stored data, ESPE 800 may store queries and stream data through them to allow continuous analysis of data as it is received. The one or more source windows 806 and the one or more derived windows 808 may be created based on the relational, pattern matching, and procedural algorithms that transform the input event streams into the output event streams to model, simulate, score, test, predict, etc. based on the continuous query model defined and application to the streamed data.

In an operation 906, a publish/subscribe (pub/sub) capability is initialized for ESPE 800. In an illustrative embodiment, a pub/sub capability is initialized for each project of the one or more projects 802. To initialize and enable pub/sub capability for ESPE 800, a port number may be provided. Pub/sub clients can use a host name of an ESP device running the ESPE and the port number to establish pub/sub connections to ESPE 800.

FIG. 10 illustrates an ESP system 1000 interfacing between publishing device 1022 and event subscribing devices 1024a-c, according to embodiments of the present technology. ESP system 1000 may include ESP device or subsystem 1001, event publishing device 1022, an event subscribing device A 1024a, an event subscribing device B 1024b, and an event subscribing device C 1024c. Input event streams are output to ESP subsystem 1001 by publishing device 1022. In alternative embodiments, the input event streams may be created by a plurality of publishing devices. The plurality of publishing devices further may publish event streams to other ESP devices. The one or more continuous queries instantiated by ESPE 800 may analyze and process the input event streams to form output event streams output to event subscribing device A 1024a, event subscribing device B 1024b, and event subscribing device C 1024c. ESP system 1000 may include a greater or a fewer number of event subscribing devices of event subscribing devices.

Publish-subscribe is a message-oriented interaction paradigm based on indirect addressing. Processed data recipients specify their interest in receiving information from ESPE 800 by subscribing to specific classes of events, while information sources publish events to ESPE 800 without directly addressing the receiving parties. ESPE 800 coordinates the interactions and processes the data. In some cases, the data source receives confirmation that the published information has been received by a data recipient.

A publish/subscribe API may be described as a library that enables an event publisher, such as publishing device 1022, to publish event streams into ESPE 800 or an event subscriber, such as event subscribing device A 1024a, event subscribing device B 1024b, and event subscribing device C 1024c, to subscribe to event streams from ESPE 800. For illustration, one or more publish/subscribe APIs may be defined. Using the publish/subscribe API, an event publishing application may publish event streams into a running event stream processor project source window of ESPE 800, and the event subscription application may subscribe to an event stream processor project source window of ESPE 800.

The publish/subscribe API provides cross-platform connectivity and endianness compatibility between ESP application and other networked applications, such as event publishing applications instantiated at publishing device 1022, and event subscription applications instantiated at one or more of event subscribing device A 1024a, event subscribing device B 1024b, and event subscribing device C 1024c.

Referring back to FIG. 9, operation 906 initializes the publish/subscribe capability of ESPE 800. In an operation 908, the one or more projects 802 are started. The one or more started projects may run in the background on an ESP device. In an operation 910, an event block object is received from one or more computer system of the event publishing device 1022.

ESP subsystem 1001 may include a publishing client 1002, ESPE 800, a subscribing client A 1004, a subscribing client B 1006, and a subscribing client C 1008. Publishing client 1002 may be started by an event publishing application executing at publishing device 1022 using the publish/subscribe API. Subscribing client A 1004 may be started by an event subscription application A, executing at event subscribing device A 1024a using the publish/subscribe API. Subscribing client B 1006 may be started by an event subscription application B executing at event subscribing device B 1024b using the publish/subscribe API. Subscribing client C 1008 may be started by an event subscription application C executing at event subscribing device C 1024c using the publish/subscribe API.

An event block object containing one or more event objects is injected into a source window of the one or more source windows 806 from an instance of an event publishing application on event publishing device 1022. The event block object may be generated, for example, by the event publishing application and may be received by publishing client 1002. A unique ID may be maintained as the event block object is passed between the one or more source windows 806 and/or the one or more derived windows 808 of ESPE 800, and to subscribing client A 1004, subscribing client B 1006, and subscribing client C 1008 and to event subscription device A 1024a, event subscription device B 1024*b*, and event subscription device C 1024*c*. Publishing client 1002 may further generate and include a unique embedded transaction ID in the event block object as the event block object is processed by a continuous query, as well as the unique ID that publishing device 1022 assigned to the event block object.

In an operation 912, the event block object is processed through the one or more continuous queries 804. In an operation 914, the processed event block object is output to one or more computer systems of the event subscribing devices 1024*a-c*. For example, subscribing client A 1004, subscribing client B 1006, and subscribing client C 1008 may send the received event block object to event subscription device A 1024*a*, event subscription device B 1024*b*, and event subscription device C 1024*c*, respectively.

ESPE 800 maintains the event block containership aspect of the received event blocks from when the event block is published into a source window and works its way through the directed graph defined by the one or more continuous queries 804 with the various event translations before being output to subscribers. Subscribers can correlate a group of subscribed events back to a group of published events by comparing the unique ID of the event block object that a publisher, such as publishing device 1022, attached to the event block object with the event block ID received by the subscriber.

In an operation 916, a determination is made concerning whether or not processing is stopped. If processing is not stopped, processing continues in operation 910 to continue receiving the one or more event streams containing event block objects from the, for example, one or more network devices. If processing is stopped, processing continues in an operation 918. In operation 918, the started projects are stopped. In operation 920, the ESPE is shutdown.

As noted, in some embodiments, big data is processed for an analytics project after the data is received and stored. In other embodiments, distributed applications process continuously flowing data in real-time from distributed sources by applying queries to the data before distributing the data to geographically distributed recipients. As noted, an event stream processing engine (ESPE) may continuously apply the queries to the data as it is received and determines which entities receive the processed data. This allows for large amounts of data being received and/or collected in a variety of environments to be processed and distributed in real time. For example, as shown with respect to FIG. 2, data may be collected from network devices that may include devices within the internet of things, such as devices within a home automation network. However, such data may be collected from a variety of different resources in a variety of different environments. In any such situation, embodiments of the present technology allow for real-time processing of such data.

Aspects of the current disclosure provide technical solutions to technical problems, such as computing problems that arise when an ESP device fails which results in a complete service interruption and potentially significant data loss. The data loss can be catastrophic when the streamed data is supporting mission critical operations such as those in support of an ongoing manufacturing or drilling operation. An embodiment of an ESP system achieves a rapid and seamless failover of ESPE running at the plurality of ESP devices without service interruption or data loss, thus significantly improving the reliability of an operational system that relies on the live or real-time processing of the data streams. The event publishing systems, the event subscribing systems, and each ESPE not executing at a failed ESP device are not aware of or effected by the failed ESP device. The ESP system may include thousands of event publishing systems and event subscribing systems. The ESP system keeps the failover logic and awareness within the boundaries of out-messaging network connector and out-messaging network device.

In one example embodiment, a system is provided to support a failover when event stream processing (ESP) event blocks. The system includes, but is not limited to, an out-messaging network device and a computer system. The computer system includes, but is not limited to, a processor and a computer-readable medium operably coupled to the processor. The processor is configured to execute an ESP engine (ESPE). The computer-readable medium has instructions stored thereon that, when executed by the processor, cause the computer system to support the failover. An event block object is received from the ESPE that includes a unique identifier. A first status of the computer system as active or standby is determined. When the first status is active, a second status of the computer system as newly active or not newly active is determined. Newly active is determined when the computer system is switched from a standby status to an active status. When the second status is newly active, a last published event block object identifier that uniquely identifies a last published event block object is determined. A next event block object is selected from a non-transitory computer-readable medium accessible by the computer system. The next event block object has an event block object identifier that is greater than the determined last published event block object identifier. The selected next event block object is published to an out-messaging network device. When the second status of the computer system is not newly active, the received event block object is published to the out-messaging network device. When the first status of the computer system is standby, the received event block object is stored in the non-transitory computer-readable medium.

Figure 11:
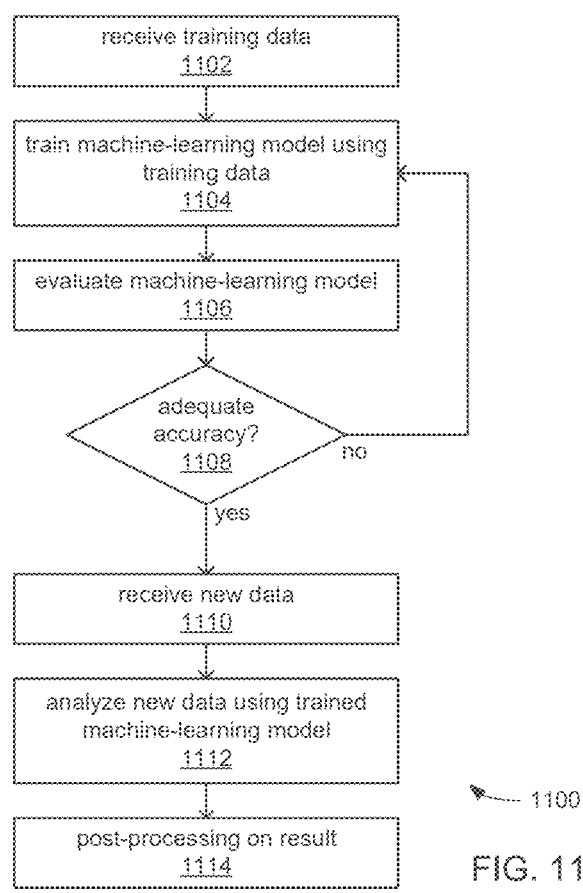
FIG. 11 shows a flow chart of an example of a process for generating and using a machine-learning model according to some aspects of the present disclosure.

FIG. 11 is a flow chart of an example of a process for generating and using a machine-learning model according to some aspects. Machine learning is a branch of artificial intelligence that relates to mathematical models that can learn from, categorize, and make predictions about data. Such mathematical models, which can be referred to as machine-learning models, can classify input data among two or more classes; cluster input data among two or more groups; predict a result based on input data; identify patterns or trends in input data; identify a distribution of input data in a space; or any combination of these. Examples of machine-learning models can include (i) neural networks; (ii) decision trees, such as classification trees and regression trees; (iii) classifiers, such as Naïve bias classifiers, logistic regression classifiers, ridge regression classifiers, random forest classifiers, least absolute shrinkage and selector (LASSO) classifiers, and support vector machines; (iv) clusterers, such as k-means clusterers, mean-shift clusterers, and spectral clusterers; (v) factorizers, such as factorization machines, principal component analyzers and kernel principal component analyzers; and (vi) ensembles or other combinations of machine-learning models. In some examples, neural networks can include deep neural networks, feed-forward neural networks, recurrent neural networks, convolutional neural networks, radial basis function (RBF) neural networks, echo state neural networks, long short-term memory neural networks, bi-directional recurrent neural networks, gated neural networks, hierarchical recurrent neural networks, stochastic neural networks, modular neural networks, spiking neural networks, dynamic neural networks, cascading neural networks, neuro-fuzzy neural networks, or any combination of these.

Different machine-learning models may be used interchangeably to perform a task. Examples of tasks that can be performed at least partially using machine-learning models include various types of scoring; bioinformatics; cheminformatics; software engineering; fraud detection; customer segmentation; generating online recommendations; adaptive websites; determining customer lifetime value; search engines; placing advertisements in real time or near real time; classifying DNA sequences; affective computing; performing natural language processing and understanding; object recognition and computer vision; robotic locomotion; playing games; optimization and metaheuristics; detecting network intrusions; medical diagnosis and monitoring; or predicting when an asset, such as a machine, will need maintenance.

Any number and combination of tools can be used to create machine-learning models. Examples of tools for creating and managing machine-learning models can include SAS® Enterprise Miner, SAS® Rapid Predictive Modeler, and SAS® Model Manager, SAS Cloud Analytic Services (CAS)®, SAS Viya® of all which are by SAS Institute Inc. of Cary, North Carolina.

Machine-learning models can be constructed through an at least partially automated (e.g., with little or no human involvement) process called training. During training, input data can be iteratively supplied to a machine-learning model to enable the machine-learning model to identify patterns related to the input data or to identify relationships between the input data and output data. With training, the machine-learning model can be transformed from an untrained state to a trained state. Input data can be split into one or more training sets and one or more validation sets, and the training process may be repeated multiple times. The splitting may follow a k-fold cross-validation rule, a leave-one-out-rule, a leave-p-out rule, or a holdout rule. An overview of training and using a machine-learning model is described below with respect to the flow chart of FIG. 11.

In block 1102, training data is received. In some examples, the training data is received from a remote database or a local database, constructed from various subsets of data, or input by a user. The training data can be used in its raw form for training a machine-learning model or pre-processed into another form, which can then be used for training the machine-learning model. For example, the raw form of the training data can be smoothed, truncated, aggregated, clustered, or otherwise manipulated into another form, which can then be used for training the machine-learning model.

In block 1104, a machine-learning model is trained using the training data. The machine-learning model can be trained in a supervised, unsupervised, or semi-supervised manner. In supervised training, each input in the training data is correlated to a desired output. This desired output may be a scalar, a vector, or a different type of data structure such as text or an image. This may enable the machine-learning model to learn a mapping between the inputs and desired outputs. In unsupervised training, the training data includes inputs, but not desired outputs, so that the machine-learning model has to find structure in the inputs on its own. In semi-supervised training, only some of the inputs in the training data are correlated to desired outputs.

In block 1106, the machine-learning model is evaluated. For example, an evaluation dataset can be obtained, for example, via user input or from a database. The evaluation dataset can include inputs correlated to desired outputs. The inputs can be provided to the machine-learning model and the outputs from the machine-learning model can be compared to the desired outputs. If the outputs from the machine-learning model closely correspond with the desired outputs, the machine-learning model may have a high degree of accuracy. For example, if 90% or more of the outputs from the machine-learning model are the same as the desired outputs in the evaluation dataset, the machine-learning model may have a high degree of accuracy. Otherwise, the machine-learning model may have a low degree of accuracy. The 90% number is an example only. A realistic and desirable accuracy percentage is dependent on the problem and the data.

In some examples, if, at block 1108, the machine-learning model has an inadequate degree of accuracy for a particular task, the process can return to block 1104, where the machine-learning model can be further trained using additional training data or otherwise modified to improve accuracy. However, if, at block 1108, the machine-learning model has an adequate degree of accuracy for the particular task, the process can continue to block 1110.

In block 1110, new data is received. In some examples, the new data is received from a remote database or a local database, constructed from various subsets of data, or input by a user. The new data may be unknown to the machine-learning model. For example, the machine-learning model may not have previously processed or analyzed the new data.

In block 1112, the trained machine-learning model is used to analyze the new data and provide a result. For example, the new data can be provided as input to the trained machine-learning model. The trained machine-learning model can analyze the new data and provide a result that includes a classification of the new data into a particular class, a clustering of the new data into a particular group, a prediction based on the new data, or any combination of these.

In block 1114, the result is post-processed. For example, the result can be added to, multiplied with, or otherwise combined with other data as part of a job. As another example, the result can be transformed from a first format, such as a time series format, into another format, such as a count series format. Any number and combination of operations can be performed on the result during post-processing.

Figure 12:
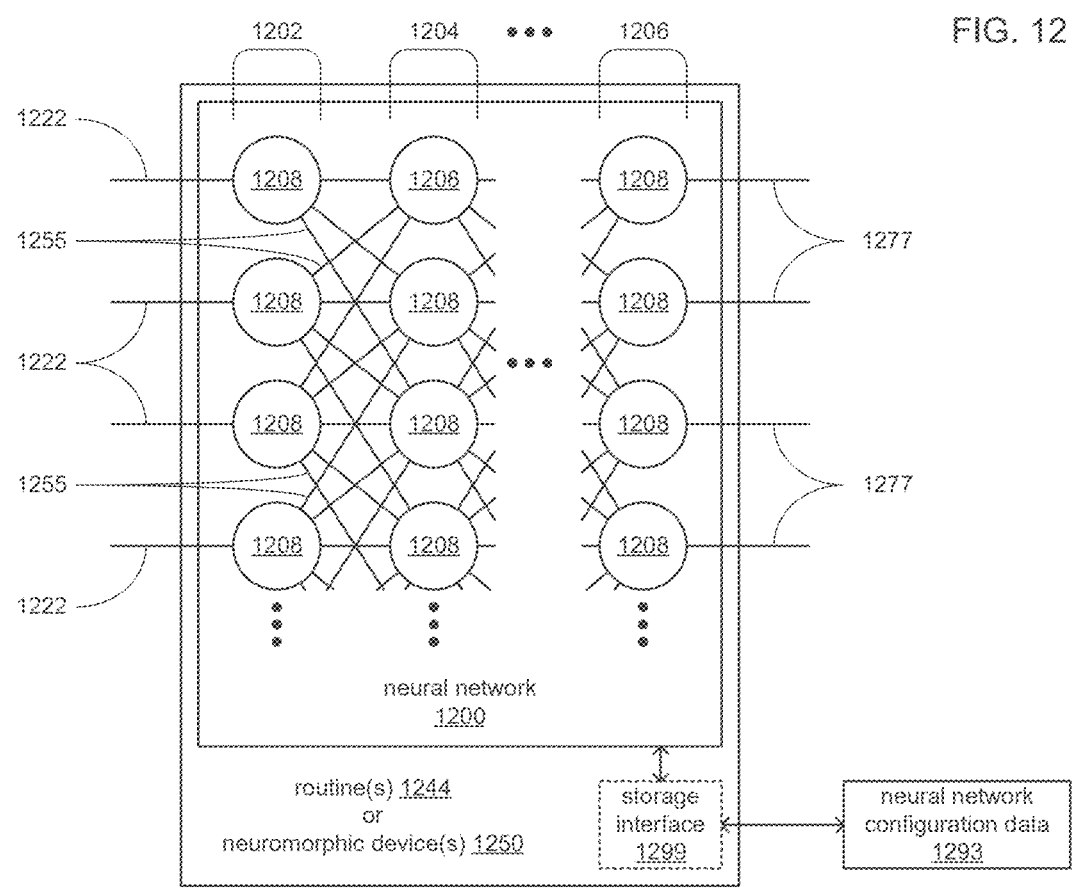
FIG. 12 shows a node-link diagram of an example of a neural network according to some aspects of the present disclosure.

A more specific example of a machine-learning model is the neural network 1200 shown in FIG. 12. The neural network 1200 is represented as multiple layers of neurons 1208 that can exchange data between one another via connections 1255 that may be selectively instantiated thereamong. The layers include an input layer 1202 for receiving input data provided at inputs 1222, one or more hidden layers 1204, and an output layer 1206 for providing a result at outputs 1277. The hidden layer(s) 1204 are referred to as hidden because they may not be directly observable or have their inputs or outputs directly accessible during the normal functioning of the neural network 1200. Although the neural network 1200 is shown as having a specific number of layers and neurons for exemplary purposes, the neural network 1200 can have any number and combination of layers, and each layer can have any number and combination of neurons.

The neurons 1208 and connections 1255 thereamong may have numeric weights, which can be tuned during training of the neural network 1200. For example, training data can be provided to at least the inputs 1222 to the input layer 1202 of the neural network 1200, and the neural network 1200 can use the training data to tune one or more numeric weights of the neural network 1200. In some examples, the neural network 1200 can be trained using backpropagation. Backpropagation can include determining a gradient of a particular numeric weight based on a difference between an actual output of the neural network 1200 at the outputs 1277 and a desired output of the neural network 1200. Based on the gradient, one or more numeric weights of the neural network 1200 can be updated to reduce the difference therebetween, thereby increasing the accuracy of the neural network 1200. This process can be repeated multiple times to train the neural network 1200. For example, this process can be repeated hundreds or thousands of times to train the neural network 1200.

In some examples, the neural network 1200 is a feed-forward neural network. In a feed-forward neural network, the connections 1255 are instantiated and/or weighted so that every neuron 1208 only propagates an output value to a subsequent layer of the neural network 1200. For example, data may only move one direction (forward) from one neuron 1208 to the next neuron 1208 in a feed-forward neural network. Such a "forward" direction may be defined as proceeding from the input layer 1202 through the one or more hidden layers 1204, and toward the output layer 1206.

In other examples, the neural network 1200 may be a recurrent neural network. A recurrent neural network can include one or more feedback loops among the connections 1255, thereby allowing data to propagate in both forward and backward through the neural network 1200. Such a "backward" direction may be defined as proceeding in the opposite direction of forward, such as from the output layer 1206 through the one or more hidden layers 1204, and toward the input layer 1202. This can allow for information to persist within the recurrent neural network. For example, a recurrent neural network can determine an output based at least partially on information that the recurrent neural network has seen before, giving the recurrent neural network the ability to use previous input to inform the output.

In some examples, the neural network 1200 operates by receiving a vector of numbers from one layer; transforming the vector of numbers into a new vector of numbers using a matrix of numeric weights, a nonlinearity, or both; and providing the new vector of numbers to a subsequent layer ("subsequent" in the sense of moving "forward") of the neural network 1200. Each subsequent layer of the neural network 1200 can repeat this process until the neural network 1200 outputs a final result at the outputs 1277 of the output layer 1206. For example, the neural network 1200 can receive a vector of numbers at the inputs 1222 of the input layer 1202. The neural network 1200 can multiply the vector of numbers by a matrix of numeric weights to determine a weighted vector. The matrix of numeric weights can be tuned during the training of the neural network 1200. The neural network 1200 can transform the weighted vector using a nonlinearity, such as a sigmoid tangent or the hyperbolic tangent. In some examples, the nonlinearity can include a rectified linear unit, which can be expressed using the equation $y=\max(x, 0)$ where y is the output and x is an input value from the weighted vector. The transformed output can be supplied to a subsequent layer (e.g., a hidden layer 1204) of the neural network 1200. The subsequent layer of the neural network 1200 can receive the transformed output, multiply the transformed output by a matrix of numeric weights and a nonlinearity, and provide the result to yet another layer of the neural network 1200 (e.g., another, subsequent, hidden layer 1204). This process continues until the neural network 1200 outputs a final result at the outputs 1277 of the output layer 1206.

As also depicted in FIG. 12, the neural network 1200 may be implemented either through the execution of the instructions of one or more routines 1244 by central processing units (CPUs), or through the use of one or more neuromorphic devices 1250 that incorporate a set of memristors (or other similar components) that each function to implement one of the neurons 1208 in hardware. Where multiple neuromorphic devices 1250 are used, they may be interconnected in a depth-wise manner to enable implementing neural networks with greater quantities of layers, and/or in a width-wise manner to enable implementing neural networks having greater quantities of neurons 1208 per layer.

The neuromorphic device 1250 may incorporate a storage interface 1299 by which neural network configuration data 1293 that is descriptive of various parameters and hyperparameters of the neural network 1200 may be stored and/or retrieved. More specifically, the neural network configuration data 1293 may include such parameters as weighting and/or biasing values derived through the training of the neural network 1200, as has been described. Alternatively or additionally, the neural network configuration data 1293 may include such hyperparameters as the manner in which the neurons 1208 are to be interconnected (e.g., feed-forward or recurrent), the trigger function to be implemented within the neurons 1208, the quantity of layers and/or the overall quantity of the neurons 1208. The neural network configuration data 1293 may provide such information for more than one neuromorphic device 1250 where multiple ones have been interconnected to support larger neural networks.

Other examples of the present disclosure may include any number and combination of machine-learning models having any number and combination of characteristics. The machine-learning model(s) can be trained in a supervised, semi-supervised, or unsupervised manner, or any combination of these. The machine-learning model(s) can be implemented using a single computer system or multiple computer systems, such as the communications grid computing system 400 discussed above.

Implementing some examples of the present disclosure at least in part by using machine-learning models can reduce the total number of processing iterations, time, memory, electrical power, or any combination of these consumed by a computer system when analyzing data. For example, a neural network may more readily identify patterns in data than other approaches. This may enable the neural network to analyze the data using fewer processing cycles and less memory than other approaches, while obtaining a similar or greater level of accuracy.

Some machine-learning approaches may be more efficiently and speedily executed and processed with machine-learning specific processors (e.g., not a generic CPU). Such processors may also provide an energy savings when compared to generic CPUs. For example, some of these processors can include a graphical processing unit (GPU), an application-specific integrated circuit (ASIC), a field-programmable gate array (FPGA), an artificial intelligence (AI) accelerator, a neural computing core, a neural computing engine, a neural processing unit, a purpose-built chip architecture for deep learning, and/or some other machine-learning specific processor that implements a machine learning approach or one or more neural networks using semiconductor (e.g., silicon (Si), gallium arsenide(GaAs)) devices. These processors may also be employed in heterogeneous computing architectures with a number of and/or a variety of different types of cores, engines, nodes, and/or layers to achieve various energy efficiencies, processing speed improvements, data communication speed improvements, and/or data efficiency targets and improvements throughout various parts of the system when compared to a homogeneous computing architecture that employs CPUs for general purpose computing.

Figure 13:
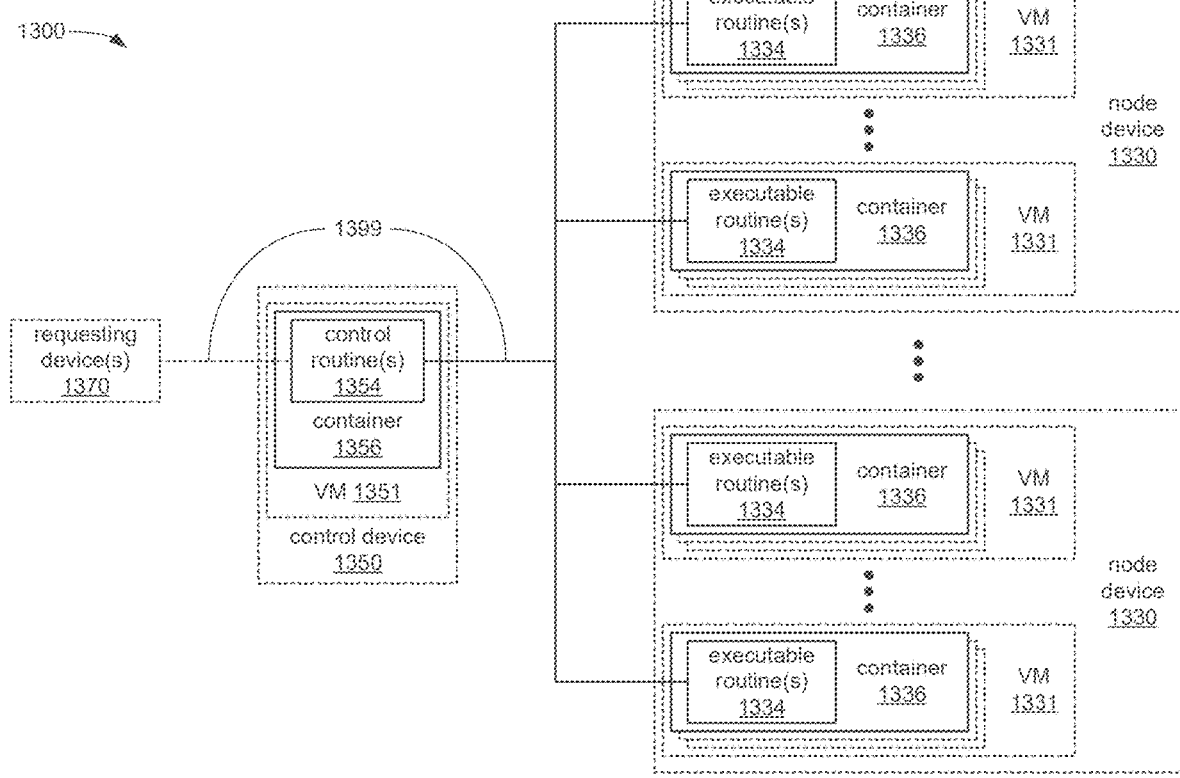
FIG. 13 shows various aspects of the use of containers as a mechanism to allocate processing, storage and/or other resources of a processing system to the performance of various analyses according to some aspects of the present disclosure.

FIG. 13 illustrates various aspects of the use of containers 1336 as a mechanism to allocate processing, storage and/or other resources of a processing system 1300 to the performance of various analyses. More specifically, in a processing system 1300 that includes one or more node devices 1330 (e.g., the aforementioned grid system 400), the processing, storage and/or other resources of each node device 1330 may be allocated through the instantiation and/or maintenance of multiple containers 1336 within the node devices 1330 to support the performance(s) of one or more analyses. As each container 1336 is instantiated, predetermined amounts of processing, storage and/or other resources may be allocated thereto as part of creating an execution environment therein in which one or more executable routines 1334 may be executed to cause the performance of part or all of each analysis that is requested to be performed.

It may be that at least a subset of the containers 1336 are each allocated a similar combination and amounts of resources so that each is of a similar configuration with a similar range of capabilities, and therefore, are interchangeable. This may be done in embodiments in which it is desired to have at least such a subset of the containers 1336 already instantiated prior to the receipt of requests to perform analyses, and thus, prior to the specific resource requirements of each of those analyses being known.

Alternatively or additionally, it may be that at least a subset of the containers 1336 are not instantiated until after the processing system 1300 receives requests to perform analyses where each request may include indications of the resources required for one of those analyses. Such information concerning resource requirements may then be used to guide the selection of resources and/or the amount of each resource allocated to each such container 1336. As a result, it may be that one or more of the containers 1336 are caused to have somewhat specialized configurations such that there may be differing types of containers to support the performance of different analyses and/or different portions of analyses.

It may be that the entirety of the logic of a requested analysis is implemented within a single executable routine 1334. In such embodiments, it may be that the entirety of that analysis is performed within a single container 1336 as that single executable routine 1334 is executed therein. However, it may be that such a single executable routine 1334, when executed, is at least intended to cause the instantiation of multiple instances of itself that are intended to be executed at least partially in parallel. This may result in the execution of multiple instances of such an executable routine 1334 within a single container 1336 and/or across multiple containers 1336.

Alternatively or additionally, it may be that the logic of a requested analysis is implemented with multiple differing executable routines 1334. In such embodiments, it may be that at least a subset of such differing executable routines 1334 are executed within a single container 1336. However, it may be that the execution of at least a subset of such differing executable routines 1334 is distributed across multiple containers 1336.

Where an executable routine 1334 of an analysis is under development, and/or is under scrutiny to confirm its functionality, it may be that the container 1336 within which that executable routine 1334 is to be executed is additionally configured assist in limiting and/or monitoring aspects of the functionality of that executable routine 1334. More specifically, the execution environment provided by such a container 1336 may be configured to enforce limitations on accesses that are allowed to be made to memory and/or I/O addresses to control what storage locations and/or I/O devices may be accessible to that executable routine 1334. Such limitations may be derived based on comments within the programming code of the executable routine 1334 and/or other information that describes what functionality the executable routine 1334 is expected to have, including what memory and/or I/O accesses are expected to be made when the executable routine 1334 is executed. Then, when the executable routine 1334 is executed within such a container 1336, the accesses that are attempted to be made by the executable routine 1334 may be monitored to identify any behavior that deviates from what is expected.

Where the possibility exists that different executable routines 1334 may be written in different programming languages, it may be that different subsets of containers 1336 are configured to support different programming languages. In such embodiments, it may be that each executable routine 1334 is analyzed to identify what programming language it is written in, and then what container 1336 is assigned to support the execution of that executable routine 1334 may be at least partially based on the identified programming language. Where the possibility exists that a single requested analysis may be based on the execution of multiple executable routines 1334 that may each be written in a different programming language, it may be that at least a subset of the containers 1336 are configured to support the performance of various data structure and/or data format conversion operations to enable a data object output by one executable routine 1334 written in one programming language to be accepted as an input to another executable routine 1334 written in another programming language.

As depicted, at least a subset of the containers 1336 may be instantiated within one or more VMs 1331 that may be instantiated within one or more node devices 1330. Thus, in some embodiments, it may be that the processing, storage and/or other resources of at least one node device 1330 may be partially allocated through the instantiation of one or more VMs 1331, and then in turn, may be further allocated within at least one VM 1331 through the instantiation of one or more containers 1336.

In some embodiments, it may be that such a nested allocation of resources may be carried out to effect an allocation of resources based on two differing criteria. By way of example, it may be that the instantiation of VMs 1331 is used to allocate the resources of a node device 1330 to multiple users or groups of users in accordance with any of a variety of service agreements by which amounts of processing, storage and/or other resources are paid for each such user or group of users. Then, within each VM 1331 or set of VMs 1331 that is allocated to a particular user or group of users, containers 1336 may be allocated to distribute the resources allocated to each VM 1331 among various analyses that are requested to be performed by that particular user or group of users.

As depicted, where the processing system 1300 includes more than one node device 1330, the processing system 1300 may also include at least one control device 1350 within which one or more control routines 1354 may be executed to control various aspects of the use of the node device(s) 1330 to perform requested analyses. By way of example, it may be that at least one control routine 1354 implements logic to control the allocation of the processing, storage and/or other resources of each node device 1330 to each VM 1331 and/or container 1336 that is instantiated therein. Thus, it may be the control device(s) 1350 that effects a nested allocation of resources, such as the aforementioned example allocation of resources based on two differing criteria.

As also depicted, the processing system 1300 may also include one or more distinct requesting devices 1370 from which requests to perform analyses may be received by the control device(s) 1350. Thus, and by way of example, it may be that at least one control routine 1354 implements logic to monitor for the receipt of requests from authorized users and/or groups of users for various analyses to be performed using the processing, storage and/or other resources of the node device(s) 1330 of the processing system 1300. The control device(s) 1350 may receive indications of the availability of resources, the status of the performances of analyses that are already underway, and/or still other status information from the node device(s) 1330 in response to polling, at a recurring interval of time, and/or in response to the occurrence of various preselected events. More specifically, the control device(s) 1350 may receive indications of status for each container 1336, each VM 1331 and/or each node device 1330. At least one control routine 1354 may implement logic that may use such information to select container(s) 1336, VM(s) 1331 and/or node device(s) 1330 that are to be used in the execution of the executable routine(s) 1334 associated with each requested analysis.

As further depicted, in some embodiments, the one or more control routines 1354 may be executed within one or more containers 1356 and/or within one or more VMs 1351 that may be instantiated within the one or more control devices 1350. It may be that multiple instances of one or more varieties of control routine 1354 may be executed within separate containers 1356, within separate VMs 1351 and/or within separate control devices 1350 to better enable parallelized control over parallel performances of requested analyses, to provide improved redundancy against failures for such control functions, and/or to separate differing ones of the control routines 1354 that perform different functions. By way of example, it may be that multiple instances of a first variety of control routine 1354 that communicate with the requesting device(s) 1370 are executed in a first set of containers 1356 instantiated within a first VM 1351, while multiple instances of a second variety of control routine 1354 that control the allocation of resources of the node device(s) 1330 are executed in a second set of containers 1356 instantiated within a second VM 1351. It may be that the control of the allocation of resources for performing requested analyses may include deriving an order of performance of portions of each requested analysis based on such factors as data dependencies thereamong, as well as allocating the use of containers 1336 in a manner that effectuates such a derived order of performance.

Where multiple instances of control routine 1354 are used to control the allocation of resources for performing requested analyses, such as the assignment of individual ones of the containers 1336 to be used in executing executable routines 1334 of each of multiple requested analyses, it may be that each requested analysis is assigned to be controlled by just one of the instances of control routine 1354. This may be done as part of treating each requested analysis as one or more "ACID transactions" that each have the four properties of atomicity, consistency, isolation and durability such that a single instance of control routine 1354 is given full control over the entirety of each such transaction to better ensure that all of each such transaction is either entirely performed or is entirely not performed. Allowing partial performances to occur may cause cache incoherencies and/or data corruption issues.

As additionally depicted, the control device(s) 1350 may communicate with the requesting device(s) 1370 and with the node device(s) 1330 through portions of a network 1399 extending thereamong. Again, such a network as the depicted network 1399 may be based on any of a variety of wired and/or wireless technologies, and may employ any of a variety of protocols by which commands, status, data and/or still other varieties of information may be exchanged. It may be that one or more instances of a control routine 1354 cause the instantiation and maintenance of a web portal or other variety of portal that is based on any of a variety of communication protocols, etc. (e.g., a restful API). Through such a portal, requests for the performance of various analyses may be received from requesting device(s) 1370, and/or the results of such requested analyses may be provided thereto. Alternatively or additionally, it may be that one or more instances of a control routine 1354 cause the instantiation of and maintenance of a message passing interface and/or message queues. Through such an interface and/or queues, individual containers 1336 may each be assigned to execute at least one executable routine 1334 associated with a requested analysis to cause the performance of at least a portion of that analysis.

Although not specifically depicted, it may be that at least one control routine 1354 may include logic to implement a form of management of the containers 1336 based on the Kubernetes container management platform promulgated by Could Native Computing Foundation of San Francisco, CA, USA. In such embodiments, containers 1336 in which executable routines 1334 of requested analyses may be instantiated within "pods" (not specifically shown) in which other containers may also be instantiated for the execution of other supporting routines. Such supporting routines may cooperate with control routine(s) 1354 to implement a communications protocol with the control device(s) 1350 via the network 1399 (e.g., a message passing interface, one or more message queues, etc.). Alternatively or additionally, such supporting routines may serve to provide access to one or more storage repositories (not specifically shown) in which at least data objects may be stored for use in performing the requested analyses.

Figure 14:
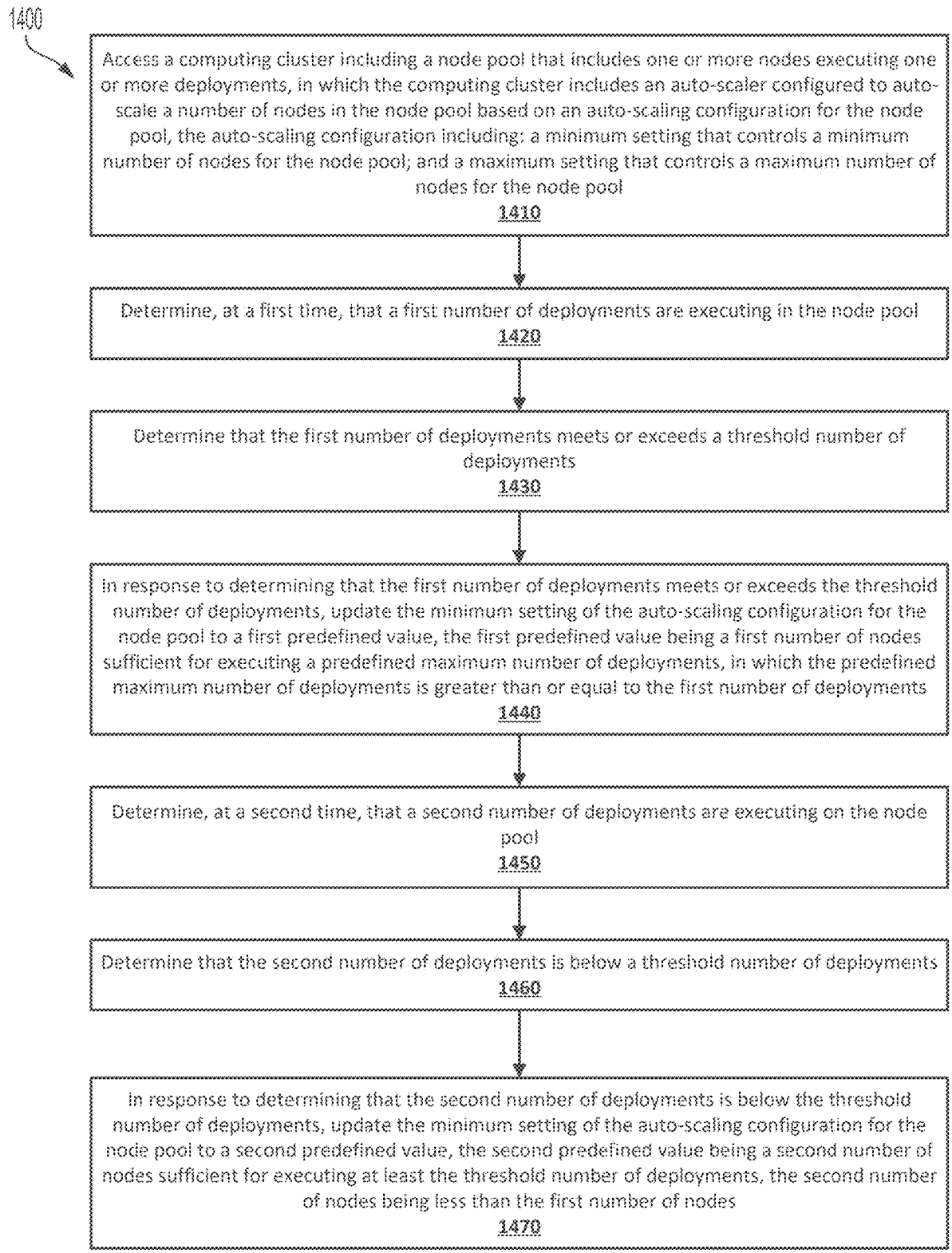
FIG. 14 shows a flowchart of an example of a process for automatically scaling a cluster of nodes based on deployments of containerized applications, according to some aspects of the present disclosure.

FIG. 14 shows a flowchart of an example of a process 1400 for automatically scaling a cluster of nodes based on deployments of containerized applications, according to some aspects of the present disclosure. Other examples may involve more operations, fewer operations, different operations, or a different order of operations than is shown in FIG. 14.

In block 1410, a computer system accesses a computing cluster including a node pool that includes one or more nodes executing one or more deployments. The computing cluster includes an auto-scaler configured to auto-scale a number of nodes in the node pool based on an auto-scaling configuration for the node pool. The auto-scaling configuration includes a minimum setting that controls a minimum number of nodes for the node pool. The auto-scaling configuration also includes a maximum setting that controls a maximum number of nodes for the node pool.

The computer system may be internal or external to the computing cluster. The computer system may include locally operated servers and associated hardware, one or more virtual machines, cloud computing resources, or a combination thereof. The various components of the computer system may be communicatively coupled using one or more networks. The one or more networks may include local networks (e.g., LANs), wide-area networks (WANs), the Internet, and so on. An example of a system used in some implementations is shown below in FIG. 15 and described in the accompanying description.

The computing cluster can include a set of nodes (e.g., physical or virtual machines) running containerized applications managed by the container orchestration software. A node can provide an execution context such as an operating system that can be used to execute the contents of at least one container, typically using a single process (e.g., an operating system process). The process, in concert with the underlying operating system, can include its own environment, resources, and lifecycle management.

The nodes may be grouped into node pools that can be used for uniform configuration of related groups of nodes, performing operations on groups of nodes (e.g., stopping all nodes in a node pool), or for convenience or comprehensibility. The one or more deployments can be deployed to an individual node or a set of nodes. Alternatively, deployments can be deployed to a node pool, effectively deploying to the nodes contained in the node pool.

In some examples, the one or more deployments executing on the node pool can each include one or more containers. For example, a deployment may be a test or application that includes a number of "containerized" self-contained modules. For instance, an example test deployment may include a web server container, a database container, and a load generator container. The web server container might run an application under test, the database container could store necessary test data, and the load generator container might simulate traffic to test the application's performance under load.

The computing cluster may be accessed by, for example, a scaling subsystem, as described below with respect to FIG. 15. For instance, the scaling subsystem may execute program code that includes identifications of the cluster, namespaces, node pools, deployments, and so on. The program code may include instructions to access the computing cluster using a suitable interface or API, such as a command-line tool, a programmatic API, a web-based API, remote procedure calls, and so on. The program code can establish a connection with the computing cluster and then proceed to perform the operations described below using the interface or API.

In block 1420, the computer system determines, at a first time, that a first number of deployments are executing in the node pool. For example, the computer system may include a scaling subsystem that can determine a number of deployments executing in a given node pool at a particular time.

In some examples, the number of deployments can be determined by counting the number of namespaces deployed to the computing cluster. For instance, the physical hierarchy including the computing cluster, node pools, and nodes can be subdivided into logical groupings using namespaces, labels, or other groupings. For example, a namespace may include certain containers running on various nodes in various node pools. The namespace can be used to conveniently refer to a collection of related containers executing on various cluster resources or locations.

In these examples, the number of namespaces serves as a proxy or substitute for the actual number of deployments. This approach may be used, for example, when each deployment is associated with a namespace that is unique to the computing cluster and the particular deployment. In other examples, one or more namespaces may include multiple deployments. In these cases, the number of deployments can be determined using a suitable command or instruction. For example, the container orchestration software may include an API for obtaining a list or count of all deployments on a cluster (across all namespaces) or for a particular namespace.

In block 1430, the computer system determines that the first number of deployments meets or exceeds a threshold number of deployments. For example, the scaling subsystem can compare the number of deployments determined in block 1420 to a predetermined threshold number of deployments. The predetermined threshold number of deployments can be chosen based on empirical observations of the computing cluster under varying loads, calculations or estimations, or other suitable methods. When no test or application is deployed, a number of namespaces may exist by default such as the default namespace, a container orchestration system namespace, a namespace for publicly accessible cluster resources, and so on. Consequently, the threshold number of deployments may be greater than 0, even when no test or application is deployed to the computing cluster.

The first number of deployments exceeding the threshold number of deployments may be experienced during, for example, software testing. During a typical test execution, a number of containers may be deployed to a cluster. The containers collectively involved in a test (or application) may be referred to as a deployment. Thus, one or more deployments may be deployed to a cluster in preparation for execution of program code for testing the deployments in various contexts. Because some tests may assume a particular initial configuration, methods for creating a stable, predictable testing environment can be an important aspect of the software development lifecycle. For example, during continuous integration and continuous deployment (CI/CD) testing a deployment may be tested in a series of environments, beginning with a simplified testing environment, then moving to a more sophisticated staging environment, and then from staging to a production or production-like environment. This workflow is sometimes referred to as deployable unit promotion testing. The latter production-like environment may involve a target environment for deployment that mirrors in some respects a production environment including a distributed, containerized deployment in a cluster. Testing in this context is typically reserved for the final stages of testing due to the complexity of deployment to a production-like environment as well as the significantly increased cost of doing so. Deployable unit promotion testing can ensure that software unit test meets requirements and does not introduce any issues that could impact the stability or performance of the system in production. Because verifying that bug fixes, new features, etc. function correctly before promotion to production is a critical step prior to release, stabilization of the shared deployable unit promotion testing environments is necessary to improve efficiency and the quality of released software. However, when clusters are configured with auto-scaling, the resultant node pool size changes and subsequent redistribution of deployments can cause unpredictable test failures because the precise initial conditions or configurations may have varied.

In block 1440, the computer system, in response to determining that the first number of deployments meets or exceeds the threshold number of deployments, updates the minimum setting of the auto-scaling configuration for the node pool to a first predefined value. The first predefined value can be a first number of nodes sufficient for executing a predefined maximum number of deployments. The predefined maximum number of deployments is greater than or equal to the first number of deployments. For example, the scaling subsystem can use an API of the container orchestration software to update the minimum setting of the auto-scaling configuration for the node pool. For instance, the container orchestration software may provide a command or API to "patch" (e.g., make changes directly to) the auto-scaling configuration. In some other examples, if the container orchestration software is provided by a cloud computing platform, the cloud computing platform may provide a tool, such as a command line tool, or API to similarly update the auto-scaling configuration.

Figure 17A:
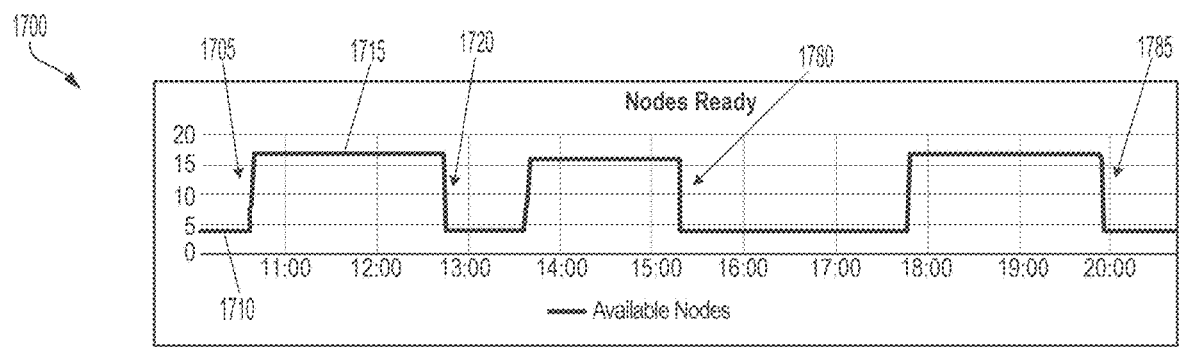
FIG. 17A shows a graphical illustration of the number of operating nodes in a computing cluster automatically scaling based on deployments of containerized applications. over several hours, according to some aspects of the present disclosure.

In some examples, responsive to updating the minimum setting of the auto-scaling configuration for the node pool to the first predefined value, the computing system can add one or more nodes to the node pool. For example, as a result of updating the minimum setting of the auto-scaling configuration for the node pool to the first predefined value, if the number of operating (e.g., "up" or operating) nodes in the node pool is currently less than the first predefined value, then a number of nodes may be started to bring the number of up nodes in the node pool to the new minimum setting. In other examples, existing nodes (e.g., nodes that are already "up") in other node pools may be reassigned to the node pool to increase the size of the node pool. The number of added nodes to the node pool may be equal to the difference between the first predefined value and the number of currently executing nodes in the node pool. The additional nodes may be started concurrently or sequentially. In some examples, the additional nodes may be started over a short period of time (e.g., several seconds or several minutes). FIG. 17A, described below, shows a depiction of the number of nodes in a node pool changing as a result of the operations in this block.

Starting of nodes may be performed using an instruction or API of the container orchestration software, such as a command to rescale a deployment, which can cause additional nodes to start. Alternatively, commands can be dispatched to a cloud service provider to directly resize the specified node pool to the desired number of nodes, which can cause additional nodes to start.

In block 1450, the computer system determines, at a second time, that a second number of deployments are executing on the node pool. Similarly to block 1420, the scaling subsystem can again determine the second number of deployments.

In block 1460, the computer system determines that the second number of deployments is below the threshold number of deployments. Similarly to block 1430, the scaling subsystem can compare the second number of deployments determined in block 1450 to a predetermined threshold number of deployments. The predetermined threshold number of deployments used in this operation can be the same as, or different from, the threshold number of deployments used in block 1430.

In block 1470, the computer system, in response to determining that the second number of deployments is below the threshold number of deployments, updates the minimum setting of the auto-scaling configuration for the node pool to a second predefined value. The second predefined value can be a second number of nodes sufficient for executing at least the threshold number of deployments. The second number of nodes can be less than the first number of nodes. Similarly to block 1440, the scaling subsystem can again update the minimum setting of the auto-scaling configuration for the node pool to the second predefined value.

In some examples, responsive to updating the minimum setting of the auto-scaling configuration for the node pool to the second predefined value, the computing system can remove one or more nodes from the node pool. For instance, the computing system can shut down the one or more nodes or reassign the one or more nodes to another node pool. Based on updating the minimum setting of the auto-scaling configuration for the node pool to the second predefined value, if the number of nodes in the node pool is currently greater than the second predefined value, then the auto-scaler may reduce the number of nodes to bring the number of up nodes in the node pool down to the new minimum setting. The number of nodes to shut down and/or reassigned may be equal to the difference between the number of currently executing nodes in the node pool and the second predefined value. The nodes may be shut down and/or reassigned concurrently or sequentially. In some examples, the nodes may be shut down and/or reassigned over a short period of time (e.g., several seconds or several minutes). FIG. 17A below shows a depiction of the number of nodes in a node pool changing as a result of the operations in this block. In some examples, the nodes may be shut down according to the configuration of the auto-scaler. For instance, some auto-scalers may be configured to shut down a node when cluster load is below a threshold value for a predetermined period of time, until the number of nodes equals the new minimum. This in effect gradually or incrementally changes the number of nodes in the node pool.

Figure 15:
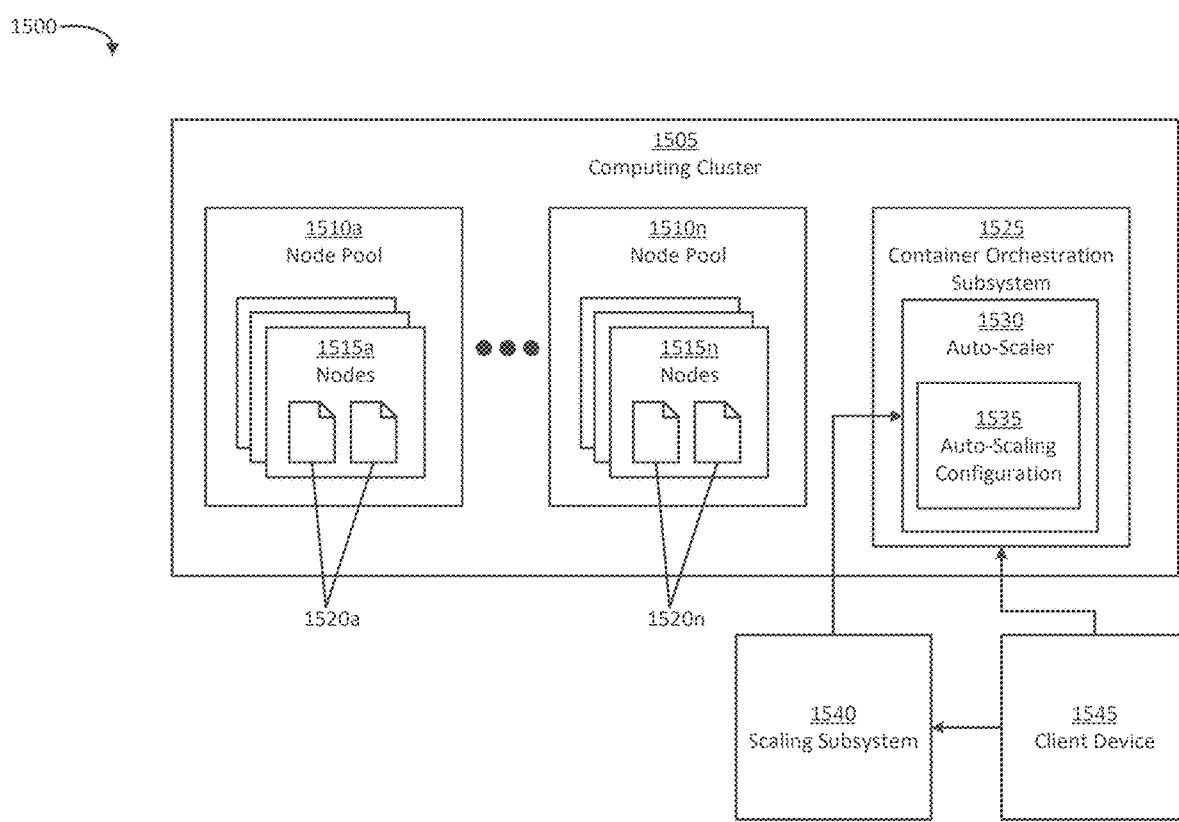
FIG. 15 shows an example of a system that can be used for automatically scaling a cluster of nodes based on deployments of containerized applications, according to some aspects of the present disclosure.

Turning now to FIG. 15, FIG. 15 shows an example of a system 1500 that can be used for automatically scaling the number of nodes in a computing cluster based on deployments of containerized applications, according to some aspects of the present disclosure. The system 1500 may be deployed on one or more computing devices, such as a cloud computing system or computing cluster containing any number of computing nodes. The components depicted in the example system 1500 may be hosted together, separately, or any combination thereof. For instance, the container orchestration subsystem 1525 and the scaling subsystem 1540 may be communicatively coupled software components executed on disparate computer systems or the same computer system.

System 1500 includes a computing cluster 1505 such as the node devices 1330 depicted in system 1300 of FIG. 13. The computing cluster 1505 generally includes a number of nodes 1515a-1515n. The nodes 1515a-1515n may be physical servers, virtual servers executing under a hypervisor (e.g., VMs 1331), virtual nodes provisioned by a cloud compute provider, or other abstraction for executing program code as well as a combination thereof.

In various examples, the nodes 1515a-1515n may be grouped based on application requirements or for convenience. In the example of system 1500, the nodes 1515a-1515n are included in node pools 1510a-1510n. The node pools 1510a-1510n can be used to, for example, group nodes 1515a-1515n with a common configuration or other unifying feature. With nodes 1515a-1515n thus grouped, a configuration or setting of each of the nodes 1515a-1515n in a particular node pool can be updated using a single command. Other physical and logical groupings of nodes 1515a-1515n may be used in various examples. For example, namespaces or labels can be used to create logical groupings of cluster resources such as nodes 1515a-1515n, cluster services, volumes, etc.

The nodes 1515a-1515n shown in node pools 1510a-1510n are in an "up" or operating status. Nodes 1515a-1515n that are up can each receive and execute one or more containers 1520a-1520n. In a typical configuration, a node 1515a executes a container 1520a using a process (e.g., an operating system process). However, nodes 1515a-1515n may each execute multiple containers 1520a-1520n and may use more than one process, according to various examples. In the example system 1500, the nodes 1515a-1515n are depicted with two containers 1520a-1520n executing in each node. The containers 1520a-1520n can be similar, in some respects, to the containers 1336 depicted in system 1300 of FIG. 13. For instance, the containers 1520a-1520n can be configured to execute the executable routines 1334 described in FIG. 13 above.

System 1500 includes a container orchestration subsystem 1525 as may be provided by a container orchestration platform. The container orchestration subsystem 1525 may be executed by, for example, container orchestration software executed by system 1500. In some examples, the container orchestration subsystem 1525 may be a component of the control device 1350 of system 1300 and the container orchestration software may be similar, in some respects, to the control routines 1354. The container orchestration software can include components for managing the deployment, scaling, and operation of deployable or deployed containers in the nodes 1515a-1515n of the computing cluster 1505. In some examples, containers 1520a-1520n may be instantiated within groupings such as the "pods" described with respect to FIG. 13 above in which other containers may also be instantiated for the execution of other supporting routines.

The container orchestration subsystem 1525 includes auto-scaler 1530. The auto-scaler 1530 includes components for automatically adjusting the number of running containers 1520a-1520n and/or nodes 1515a-1515n based on real-time metrics such as CPU and memory usage. The auto-scaler 1530 can operate according to custom scaling policies defined using an auto-scaling configuration 1535. The auto-scaling configuration 1535 can allow for varying degrees of fine-tuned control over scaling behaviors. For example, the auto-scaling configuration 1535 may include tunable parameters corresponding to the minimum or maximum number of nodes to be allocated to or executing in a node pool or node pools. Other tunable parameters may include thresholds for CPU and memory utilization that can cause auto-scaling actions. The auto-scaling configuration 1535 can be edited or updated by client device 1545 using a suitable interface or API.

In system 1500, auto-scaler 1530 is shown as a component of the container orchestration subsystem 1525. However, the auto-scaler 1530 can likewise be a standalone component. Some examples may include a second auto-scaler configured to scale and assign containers to nodes 1515a-1515n in the node pools 1510a-1510n. In this case, the two auto-scalers can operate in parallel, with both auto-scalers having suitable access to the computing cluster 1505, to update the minimum number of nodes 1515a-1515n in a node pool or perform other operations. In some examples, the auto-scalers can interact or otherwise send and receive information, to prevent duplication of auto-scaling operations or conflicting auto-scaling operations.

System 1500 includes a scaling subsystem 1540. The scaling subsystem 1540 may be implemented in software, hardware, or a combination thereof. The scaling subsystem 1540 may include components for executing program code for automatically scaling the number of nodes in a computing cluster based on deployments of containerized applications. The program code may instantiate a client interface for accessing an API or interface of the container orchestration subsystem 1525. The program code may include instructions for carrying or certain operations such as some blocks described above with respect to FIG. 14. In particular, the program code may include instructions for determining a number of deployments in a cluster or node pool, comparing the determined number to one or more predefined thresholds, and updating auto-scaling configuration 1535 on the basis on the comparison.

In some examples, the functions of the scaling subsystem 1540 may be performed periodically. For instance, the scaling subsystem 1540 can be configured to determine a number of deployments, compare the number of deployments to a threshold value, and automatically update the minimum setting of the auto-scaling configuration for the node pool each time a timer expires.

In some examples, the minimum setting of the auto-scaling configuration can be updated using a command line interface or other suitable interface of the computing cluster. In these cases, the updating may involve executing a command, using the command line interface, to cause the update to the auto-scaling configuration of the node pool. For example, cloud service providers may provide a command line interface that can be used directly to programmatically execute updates, or the cloud service providers may provide an API for executing commands using an API for the command line interface. For example, the command may be an update command for updating a set of configuration information for the computing cluster. In this example, the set of configuration information may include an identifier of the node pool, the minimum number of nodes for the node pool, or the maximum number of nodes for the node pool. An example of such a command is shown in FIG. 16 and described below.

The scaling subsystem 1540 and/or container orchestration subsystem 1525 may be operated using a client device 1545. The client device 1545 may be a laptop, desktop, tablet, smartphone, or other computing device suitable for executing commands to configure automatic scaling of the number of nodes in a computing cluster based on deployments of containerized applications. For example, a graphical user interface ("GUI") may be provided to the client device 1545 for editing or executing program code on the scaling subsystem 1540 or updating the auto-scaling configuration 1535 via the container orchestration subsystem 1525. In some examples, the client device 1545 can be used to cause the program code of the scaling subsystem 1540 to execute periodically, continuously, or upon client device 1545 startup.

Turning now to FIG. 16, FIG. 16 depicts example of program code 1600 for automatically scaling the number of nodes in a computing cluster based on deployments of containerized applications, according to some aspects of the present disclosure. Program code 1600 is just one non-limiting example of an implementation of automatically scaling the number of nodes in a computing cluster based on deployments of containerized applications that includes some elements of the process 1400 described above, though other implementations are also possible. Several examples from program code 1600 are highlighted in this description.

Program code 1600 includes an example instantiation of a cloud provider command client 1605. For instance, at blocks 1440 and 1470, the command client 1605 could be used to update the minimum setting of the auto-scaling configuration for the node pool or other command or query relating to the computing cluster hosted by the cloud provider.

At 1610, a namespace count is determined, as may be used in blocks 1420 and 1450. In the code at 1610, a utility function is executed that receives the command client 1605 as a parameter, among other inputs, such as the computing cluster identifier and a resource group identifier. The utility function is invoked on a utility object instantiated at 1602. The resource group identifier may be, for example, a logical container that holds related resources used by a cloud provider. In other examples, other inputs may be used, as well as different implementations of the utility function or other approaches for obtaining the namespace count.

At 1615, the minimum setting of the auto-scaling configuration for the node pool is updated. In the code at 1615, a utility function is used to update the auto-scaling configuration, similar to the example described at 1610. The utility function at 1615 receives inputs including an indication (e.g., a Boolean value) to update the auto-scaling configuration, the resource group identifier, the cluster identifier, associative array 1604 including certain constant values (e.g., the predefined threshold values of process 1400), and other constant values. In other examples, other inputs may be used, as well as different implementations of the utility function or other approaches for updating the auto-scaling configuration.

In some examples, the first and second predefined values may be accessed from a predefined set of scaling settings such as the associative array 1604 (also referred to variously as a hash map, dictionary, etc.). In these examples, the first predefined value and the second predefined value can be selected from the predefined set of scaling settings for use in updating the minimum setting. In certain examples, the first predefined value may range between 1 and 3 and the second predefined value may range between 5 and 12. However, these are merely examples and the predefined values corresponding to the auto-scaling configuration settings can assume any suitable numerical value or range depending on the circumstances.

In some examples, the program code 1600 may further include instructions for updating the maximum setting of the auto-scaling configuration for the node pool to a third predefined value in the predefined set of scaling settings, such as the "max" values in associate array 1604. In these examples, the third predefined value is a maximum value defining the maximum number of nodes for the node pool, in contrast to the minimum value described previously. In this case, the number of nodes in the node pool can be bound by both a minimum and maximum value simultaneously.

In some examples, the associative array 1604 can be used to provide settings for multiple node pools. For instance, the node pool may be of a particular node pool type selected from among a plurality of node pool types. An identifier of the particular node pool can then be used to select a predefined set of scaling settings from among the predefined set of scaling settings in the associative array 1604 or other suitable data structure or file.

Turning now to FIG. 17A, FIG. 17A shows a graphical illustration of the number of operating nodes in a computing cluster automatically scaling based on deployments of containerized applications over several hours, according to some aspects of the present disclosure. In particular, FIG. 17A shows an example nodes count graph 1700. The graph 1700 may represent, for example, the number of nodes in a particular node pool. Feature 1705 illustrates the behavior of the node pool in response to updating a minimum setting of the auto-scaling configuration for the node pool to a first predefined value. Prior to the update, a first number of nodes 1710 are in the node pool. Following the update, the minimum number of nodes in the node pool is increased to the first predefined value 1715. The feature 1705 shows a rapid increase in the number of up nodes in the node pool. It will be appreciated that this rapid increase is not proportional to the current resource consumption of the node pool, but rather depends on the first predefined value 1715, which is predefined independently of the current resource consumption of the node pool. Thus, while the increase in the node pool's size may be triggered by the current conditions in the node pool, the final number of nodes to which the node pool's size is increased is predefined and therefore independent of the current conditions in the node pool.

Feature 1720 illustrates the subsequent decrease in the node count following updating the minimum setting of the auto-scaling configuration for the node pool to a second predefined value, less than the first predefined value. Correspondingly, the feature 1720 shows a decrease in the number of up nodes back to the first number of nodes 1710. The number of up nodes is decreased by the auto-scaler according to the configuration or mode of operation of the auto-scaler.

Figure 17B:
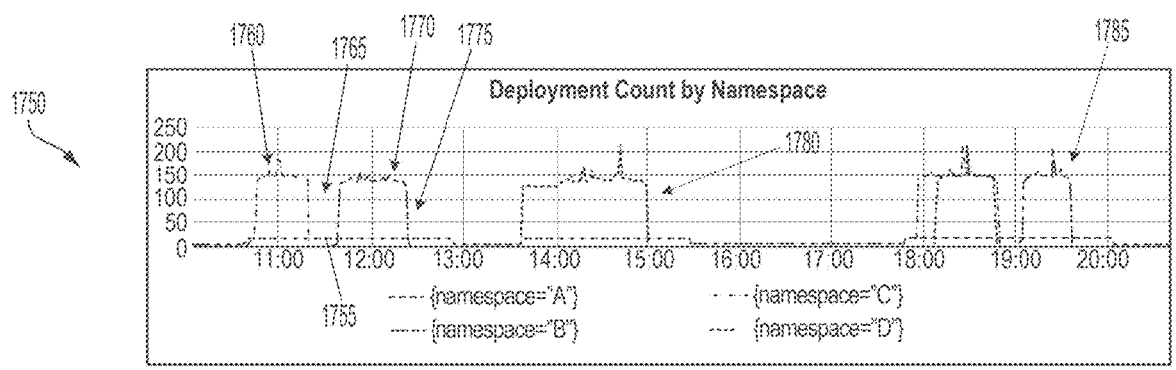
FIG. 17B shows a graphical illustration of the number of deployments in a computing cluster over several hours, according to some aspects of the present disclosure.

Turning now to FIG. 17B, FIG. 17B shows a graphical illustration of the number of deployments in a computing cluster over several hours, according to some aspects of the present disclosure. In particular, FIG. 17B shows an example of a deployments count graph 1750, representing the same cluster and time frame as graph 1700. Graph 1750 depicts lines representing the number of deployments in each of several namespaces. As described above, the deployment count for a namespace can be a proxy for the overall deployment count for a cluster or node pool.

Line 1755, corresponding to namespace "A," represents a default number of deployments as may be executing on a cluster when no test or application is deployed such as the default namespace, a container orchestration system namespace, a namespace for publicly accessible cluster resources, and so on. Feature 1760 illustrates a deployment of a number of containers associated with namespace "C" greater than a threshold number of deployments, which caused the update portrayed in feature 1705 of graph to occur. At feature 1765, the number deployments returns to the default (e.g., a test associated with namespace "A" completed), but the number of up nodes remains constant, as seen in graph 1700. This be due to either or both of the scaling subsystem 1540 operating on a timer or the characteristic response time of the auto-scaler. At feature 1770, a deployment of a number of containers associated with namespace "B" greater than a threshold number of deployments again occurred. At feature 1775, the number of deployments again returns to the default which, after a period of time, causes the update of the minimum number of nodes configured reflected in feature 1720 of graph 1700 to occur.

FIGS. 17A-B also each illustrate two more cycles of the scaling subsystem 1540 at features 1780 and 1785 in graphs 1700 and 1750. For example, feature 1780 in graph 1750 may correspond to another deployment of a number of containers associated with namespace "D" greater than the threshold number of deployments, which causes an update to the minimum setting of the auto-scaling configuration for the node pool resulting in the number of nodes in the node pool rapidly increasing to the minimum and then again returning to the previous minimum value when the deployment or test terminates, as reflected by the corresponding feature 1780 in graph 1700. Feature 1785 in graph 1750 likewise may correspond with multiple simultaneous deployments associated with namespaces "B," "C," and "D"

again causing the minimum setting of the auto-scaling configuration for the node pool to be increased to the predefined value and then returning to the initial value, as reflected by the corresponding feature 1785 in graph 1700.

In the previous description, for the purposes of explanation, specific details are set forth in order to provide a thorough understanding of examples of the technology. But various examples can be practiced without these specific details. The figures and description are not intended to be restrictive.

The previous description provides examples that are not intended to limit the scope, applicability, or configuration of the disclosure. Rather, the previous description of the examples provides those skilled in the art with an enabling description for implementing an example. Various changes may be made in the function and arrangement of elements without departing from the spirit and scope of the technology as set forth in the appended claims.

Specific details are given in the previous description to provide a thorough understanding of the examples. But the examples may be practiced without these specific details. For example, circuits, systems, networks, processes, and other components can be shown as components in block diagram form to prevent obscuring the examples in unnecessary detail. In other examples, well-known circuits, processes, algorithms, structures, and techniques may be shown without unnecessary detail in order to avoid obscuring the examples.

Also, individual examples may have been described as a process that is depicted as a flowchart, a flow diagram, a data flow diagram, a structure diagram, or a block diagram. Although a flowchart can describe the operations as a sequential process, many of the operations can be performed in parallel or concurrently. In addition, the order of the operations can be re-arranged. And a process can have more or fewer operations than are depicted in a figure. A process can correspond to a method, a function, a procedure, a subroutine, a subprogram, etc. When a process corresponds to a function, its termination can correspond to a return of the function to the calling function or the main function.

Systems depicted in some of the figures can be provided in various configurations. In some examples, the systems can be configured as a distributed system where one or more components of the system are distributed across one or more networks in a cloud computing system.

The invention claimed is:

1. A system comprising:
one or more processors; and
one or more memories including program code that is executable by the one or more processors to perform operations including:
accessing a computing cluster comprising a node pool that includes one or more nodes executing one or more deployments, the one or more deployments each being an application comprising one or more containers, wherein the computing cluster includes an auto-scaler configured to auto-scale a number of nodes in the node pool based on an auto-scaling configuration for the node pool, the auto-scaling configuration comprising:
a minimum setting that controls a minimum number of nodes for the node pool; and
a maximum setting that controls a maximum number of nodes for the node pool;
determining, at a first time, that a first number of deployments are executing in the node pool;
determining that the first number of deployments meets or exceeds a threshold number of deployments;
in response to determining that the first number of deployments meets or exceeds the threshold number of deployments, automatically updating the minimum setting of the auto-scaling configuration for the node pool to a first predefined value by transmitting a first command to an interface associated with the computing cluster, the first predefined value being a first number of nodes sufficient for executing a predefined maximum number of deployments, wherein the predefined maximum number of deployments is greater than or equal to the first number of deployments, and wherein the computing cluster is configured to respond to the first command by adding one or more additional nodes to the node pool such that the node pool has at least the first number of nodes;
determining, at a second time, that a second number of deployments are executing on the node pool;
determining that the second number of deployments is below the threshold number of deployments; and
in response to determining that the second number of deployments is below the threshold number of deployments, automatically updating the minimum setting of the auto-scaling configuration for the node pool to a second predefined value by transmitting a second command to the interface associated with the computing cluster, the second predefined value being a second number of nodes sufficient for executing at least the threshold number of deployments, the second number of nodes being less than the first number of nodes, wherein the computing cluster is configured to respond to the second command by removing one or more existing nodes from the node pool such that the node pool has at most the second number of nodes.

2. The system of claim 1, wherein the operations further comprise:
responsive to updating the minimum setting of the auto-scaling configuration for the node pool to the first predefined value, adding one or more nodes to the node pool, wherein the node pool includes at least the first number of nodes; and
responsive to updating the minimum setting of the auto-scaling configuration for the node pool to the second predefined value, removing one or more nodes from the node pool, wherein the node pool includes at least the second number of nodes.

3. The system of claim 1, wherein:
the computing cluster is executing a container orchestration platform comprising a second auto-scaler configured to scale and assign containers to nodes in the node pool.

4. The system of claim 1, wherein the operations further comprise:
accessing a predefined set of scaling settings, wherein the predefined set of scaling settings includes the first predefined value and the second predefined value; and
selecting the first predefined value and the second predefined value from the predefined set of scaling settings for use in updating the minimum setting.

5. The system of claim 4, wherein the operations further comprise:
updating the maximum setting of the auto-scaling configuration for the node pool to a third predefined value in the predefined set of scaling settings, wherein the third predefined value is a maximum value defining the maximum number of nodes for the node pool.

6. The system of claim 4, wherein the node pool is of a particular node pool type selected from among a plurality of node pool types, wherein the predefined set of scaling settings comprise a plurality of auto-scaling configurations associated with the plurality of node pool types, and wherein the operations further comprise:

selecting, from the predefined set of scaling settings, the auto-scaling configuration associated with the particular node pool type of the node pool.

7. The system of claim 6, wherein the first predefined value is between 1 and 3, and wherein the second predefined value is between 5 and 12.

8. The system of claim 1, wherein the operations further comprise, periodically:

determining a number of deployments executing in the node pool;

comparing the number of deployments to the threshold number of deployments; and in response to the comparison, automatically updating the minimum setting of the auto-scaling configuration for the node pool to the first predefined value or the second predefined value based on the number of deployments.

9. The system of claim 1, wherein the first command and the second command are update commands for updating a set of configuration information for the computing cluster, the set of configuration information including an identifier of the node pool, the minimum number of nodes for the node pool, and the maximum number of nodes for the node pool.

10. The system of claim 1, wherein the first number of deployments and the second number of deployments include a number of deployments in excess of a fixed number of base deployments in the node pool.

11. The system of claim 1, wherein determining that the first number of deployments are executing in the node pool comprises counting a number of namespaces associated with the node pool.

12. A method comprising:

accessing, by one or more processors, a computing cluster comprising a node pool that includes one or more nodes executing one or more deployments, the one or more deployments each being an application comprising one or more containers, wherein the computing cluster includes an auto-scaler configured to auto-scale a number of nodes in the node pool based on an auto-scaling configuration for the node pool, the auto-scaling configuration comprising:

a minimum setting that controls a minimum number of nodes for the node pool; and a maximum setting that controls a maximum number of nodes for the node pool;

determining, by the one or more processors and at a first time, that a first number of deployments are executing in the node pool;

determining, by the one or more processors, that the first number of deployments meets or exceeds a threshold number of deployments;

in response to determining that the first number of deployments meets or exceeds the threshold number of deployments, automatically updating the minimum setting of the auto-scaling configuration for the node pool to a first predefined value by transmitting a first command to an interface associated with the computing cluster, the first predefined value being a first number of nodes sufficient for executing a predefined maximum number of deployments, wherein the predefined maximum number of deployments is greater than or equal to the first number of deployments, and wherein the computing cluster is configured to respond to the first command by adding one or more additional nodes to the node pool such that the node pool has at least the first number of nodes;

determining, by the one or more processors and at a second time, that a second number of deployments are executing on the node pool;

determining, by the one or more processors, that the second number of deployments is below the threshold number of deployments; and in response to determining that the second number of deployments is below the threshold number of deployments, automatically updating the minimum setting of the auto-scaling configuration for the node pool to a second predefined value by transmitting a second command to the interface associated with the computing cluster, the second predefined value being a second number of nodes sufficient for executing at least the threshold number of deployments, the second number of nodes being less than the first number of nodes, wherein the computing cluster is configured to respond to the second command by removing one or more existing nodes from the node pool such that the node pool has at most the second number of nodes.

13. The method of claim 12, further comprising:

responsive to updating the minimum setting of the auto-scaling configuration for the node pool to the first predefined value, adding one or more nodes to the node pool, wherein the node pool includes at least the first number of nodes; and responsive to updating the minimum setting of the auto-scaling configuration for the node pool to the second predefined value, removing one or more nodes from the node pool, wherein the node pool includes at least the second number of nodes.

14. The method of claim 12, wherein:

the computing cluster is executing a container orchestration platform comprising a second auto-scaler configured to scale and assign containers to nodes in the node pool.

15. The method of claim 12, further comprising:

accessing a predefined set of scaling settings, wherein the predefined set of scaling settings includes the first predefined value and the second predefined value; and selecting the first predefined value and the second predefined value from the predefined set of scaling settings for use in updating the minimum setting.

16. The method of claim 15, further comprising:

updating the maximum setting of the auto-scaling configuration for the node pool to a third predefined value in the predefined set of scaling settings, wherein the third predefined value is a maximum value defining the maximum number of nodes for the node pool.

17. The method of claim 15, wherein the node pool is of a particular node pool type selected from among a plurality of node pool types, wherein the predefined set of scaling settings comprise a plurality of auto-scaling configurations associated with the plurality of node pool types, and further comprising:

selecting, from the predefined set of scaling settings, the auto-scaling configuration associated with the particular node pool type of the node pool.

18. The method of claim 12, further comprising, periodically:

determining a number of deployments executing in the node pool;

comparing the number of deployments to the threshold number of deployments; and in response to the comparison, automatically updating the minimum setting of the auto-scaling configuration for the node pool to the first predefined value or the second predefined value based on the number of deployments.

19. The method of claim 12, wherein the first command and the second command are update commands for updating a set of configuration information for the computing cluster, the set of configuration information including an identifier of the node pool, the minimum number of nodes for the node pool, and the maximum number of nodes for the node pool.

20. The method of claim 12, wherein the first number of deployments and the second number of deployments include a number of deployments in excess of a fixed number of base deployments.

21. The method of claim 12, wherein determining that the first number of deployments are executing in the node pool comprises counting a number of namespaces associated with the node pool.

22. A non-transitory computer-readable medium comprising program code that is executable by one or more processors for causing the one or more processors to:
  access a computing cluster comprising a node pool that includes one or more nodes executing one or more deployments, the one or more deployments each being an application comprising one or more containers, wherein the computing cluster includes an auto-scaler configured to auto-scale a number of nodes in the node pool based on an auto-scaling configuration for the node pool, the auto-scaling configuration comprising:
    a minimum setting that controls a minimum number of nodes for the node pool; and
    a maximum setting that controls a maximum number of nodes for the node pool;
  determine, at a first time, that a first number of deployments are executing in the node pool;
  determine that the first number of deployments meets or exceeds a threshold number of deployments;
  in response to determining that the first number of deployments meets or exceeds the threshold number of deployments, automatically update the minimum setting of the auto-scaling configuration for the node pool to a first predefined value by transmitting a first command to an interface associated with the computing cluster, the first predefined value being a first number of nodes sufficient for executing a predefined maximum number of deployments, wherein the predefined maximum number of deployments is greater than or equal to the first number of deployments, and wherein the computing cluster is configured to respond to the first command by adding one or more additional nodes to the node pool such that the node pool has at least the first number of nodes;
  determine, at a second time, that a second number of deployments are executing on the node pool;
  determine that the second number of deployments is below the threshold number of deployments; and
  in response to determining that the second number of deployments is below the threshold number of deployments, automatically update the minimum setting of the auto-scaling configuration for the node pool to a second predefined value by transmitting a second command to the interface associated with the computing cluster, the second predefined value being a second number of nodes sufficient for executing at least the threshold number of deployments, the second number of nodes being less than the first number of nodes, wherein the computing cluster is configured to respond to the second command by removing one or more existing nodes from the node pool such that the node pool has at most the second number of nodes.

23. The non-transitory computer-readable medium of claim 22, further comprising additional program code that is executable by the one or more processors for causing the one or more processors to:
  responsive to updating the minimum setting of the auto-scaling configuration for the node pool to the first predefined value, add one or more nodes to the node pool, wherein the node pool includes at least the first number of nodes; and
  responsive to updating the minimum setting of the auto-scaling configuration for the node pool to the second predefined value, remove one or more nodes from the node pool, wherein the node pool includes at least the second number of nodes.

24. The non-transitory computer-readable medium of claim 22, wherein:
  the computing cluster is executing a container orchestration platform comprising a second auto-scaler configured to scale and assign containers to nodes in the node pool.

25. The non-transitory computer-readable medium of claim 22, further comprising first additional program code that is executable by the one or more processors for causing the one or more processors to:
  access a predefined set of scaling settings, wherein the predefined set of scaling settings includes the first predefined value and the second predefined value; and
  selecting the first predefined value and the second predefined value from the predefined set of scaling settings for use in updating the minimum setting.

26. The non-transitory computer-readable medium of claim 25, further comprising second additional program code that is executable by the one or more processors for causing the one or more processors to:
  update the maximum setting of the auto-scaling configuration for the node pool to a third predefined value in the predefined set of scaling settings, wherein the third predefined value is a maximum value defining the maximum number of nodes for the node pool.

27. The non-transitory computer-readable medium of claim 25, wherein the node pool is of a particular node pool type selected from among a plurality of node pool types, wherein the predefined set of scaling settings comprise a plurality of auto-scaling configurations associated with the plurality of node pool types, and further comprising additional program code that is executable by the one or more processors for causing the one or more processors to:
  select, from the predefined set of scaling settings, the auto-scaling configuration associated with the particular node pool type of the node pool.

28. The non-transitory computer-readable medium of claim 22, further comprising additional program code that is executable by the one or more processors for causing the one or more processors to, periodically:
  determine a number of deployments executing in the node pool;
  compare the number of deployments to the threshold number of deployments; and
  automatically update the minimum setting of the auto-scaling configuration for the node pool to the first predefined value or the second predefined value based on the number of deployments in response to the comparison.

29. The non-transitory computer-readable medium of claim 22, wherein the first number of deployments and the second number of deployments include a number of deployments in excess of a fixed number of base deployments.

30. The non-transitory computer-readable medium of claim 22, wherein determining that the first number of deployments are executing in the node pool comprises counting a number of namespaces associated with the node pool.

* * * * *